(12) United States Patent
Woo

(10) Patent No.: US 12,555,805 B2
(45) Date of Patent: Feb. 17, 2026

(54) FUEL CELL SYSTEM

(71) Applicants: HYUNDAI MOTOR COMPANY, Seoul (KR); KIA CORPORATION, Seoul (KR)

(72) Inventor: Myeong Nam Woo, Yongin-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 600 days.

(21) Appl. No.: 17/846,681

(22) Filed: Jun. 22, 2022

(65) Prior Publication Data
US 2023/0027942 A1   Jan. 26, 2023

(30) Foreign Application Priority Data

Jul. 22, 2021 (KR) .................. 10-2021-0096627
Jul. 22, 2021 (KR) .................. 10-2021-0096628
Jul. 27, 2021 (KR) .................. 10-2021-0098705

(51) Int. Cl.
*H01M 8/04082* (2016.01)
*H01M 8/04111* (2016.01)
*H01M 8/04089* (2016.01)

(52) U.S. Cl.
CPC .... *H01M 8/04201* (2013.01); *H01M 8/04111* (2013.01); *H01M 8/04089* (2013.01); *H01M 2250/20* (2013.01); *Y02E 60/50* (2013.01)

(58) Field of Classification Search
CPC ......... H01M 8/04201; H01M 8/04111; H01M 2250/20; H01M 8/04089; Y02E 60/50
See application file for complete search history.

(56) References Cited

U.S. PATENT DOCUMENTS

| | | | | |
|---|---|---|---|---|
| 4,796,854 A | * | 1/1989 | Ewing | F16K 31/0693 251/282 |
| 6,082,705 A | * | 7/2000 | Arvidsson | A61M 16/206 251/129.17 |
| 6,752,169 B2 | * | 6/2004 | Callies | F16K 17/0413 137/505.3 |
| 9,997,790 B2 | | 6/2018 | Ban et al. | |

(Continued)

FOREIGN PATENT DOCUMENTS

CN 109473701 A * 3/2019
JP 2008103228 A * 5/2008

(Continued)

OTHER PUBLICATIONS

Merged file of English translation and original file of JP 2008/103228 A (Year: 2008).*

(Continued)

*Primary Examiner* — Milton I Cano
*Assistant Examiner* — Katherine J Metzger
(74) *Attorney, Agent, or Firm* — MORGAN, LEWIS & BOCKIUS LLP

(57) ABSTRACT

The present disclosure relates to a fuel cell system including an air supply line configured to supply air to a fuel cell stack, a bypass line connected to the air supply line and configured to allow the air to flow to a target position, and a bypass valve configured to selectively open or close the bypass line, thereby obtaining an advantageous effect of effectively reducing a hydrogen concentration at the target position.

6 Claims, 30 Drawing Sheets

(56) References Cited

U.S. PATENT DOCUMENTS

| | | | |
|---|---|---|---|
| 10,030,785 B2 | 7/2018 | Jung et al. | |
| 2006/0131531 A1* | 6/2006 | Ohmori | H01M 8/04156 251/129.15 |
| 2010/0068580 A1* | 3/2010 | Osada | H01M 8/04126 429/515 |
| 2010/0151337 A1* | 6/2010 | Kanazawa | H01M 8/04126 261/105 |
| 2013/0146035 A1* | 6/2013 | Eybergen | F02B 29/0475 123/562 |
| 2015/0188161 A1* | 7/2015 | Kwon | H01M 8/04111 429/446 |
| 2017/0179509 A1* | 6/2017 | Jung | F16K 31/0693 |

FOREIGN PATENT DOCUMENTS

| | | | |
|---|---|---|---|
| JP | 2009301847 A | * | 12/2009 |
| JP | 2011-222356 A | | 11/2011 |
| JP | 2015-174013 A | | 10/2015 |
| JP | 2020-161362 A | | 10/2020 |
| KR | 10-2015-0132772 A | | 11/2015 |
| KR | 10-1673769 B1 | | 11/2016 |
| KR | 10-2017-0072642 A | | 6/2017 |
| KR | 10-2019-0061711 A | | 6/2019 |

OTHER PUBLICATIONS

Merged file of English translation and original file of JP 2009/301847 A (Year: 2009).*
CN_109473701_A_Translation (Year: 2019).*
Office Action issued in Korean Patent Application No. 10-2021-0096628 dated Sep. 16, 2025.
Office Action dated Nov. 21, 2025 issued in Korean Patent Application No. 10-2021-0096627, with English translation.
Office Action issued in corresponding Korean Patent Application No. 10-2021-0098705 dated Jan. 13, 2026, with English translation.

* cited by examiner

FUEL CELL SYSTEM

CROSS-REFERENCE TO RELATED APPLICATION

This application claims priority to and the benefit of Korean Patent Application No. 10-2021-0096627 filed in the Korean Intellectual Property Office on Jul. 22, 2021, Korean Patent Application No. 10-2021-0096628 filed in the Korean Intellectual Property Office on Jul. 22, 2021, and Korean Patent Application No. 10-2021-0098705 filed in the Korean Intellectual Property Office on Jul. 27, 2021, the entire contents of which are incorporated herein by reference.

TECHNICAL FIELD

The present disclosure relates to a fuel cell system, and more particularly, to a fuel cell system and an air injection device, which are capable of reducing a hydrogen concentration at a target position.

BACKGROUND ART

A fuel cell vehicle (e.g., a hydrogen fuel cell vehicle) is configured to autonomously generate electricity by means of a chemical reaction between fuel (hydrogen) and air (oxygen) and travel by operating a motor.

In general, the fuel cell vehicle may include a fuel cell stack configured to generate electricity by means of an oxidation-reduction reaction between hydrogen and oxygen, a fuel supply device configured to supply fuel (hydrogen) to the fuel cell stack, an air supply device configured to supply the fuel cell stack with air (oxygen) which is an oxidant required for an electrochemical reaction, and a thermal management system (TMS) configured to discharge heat, which is generated from the fuel cell stack and power electronic parts of the vehicle, to the outside of the system and control temperatures of the fuel cell stack and the power electronic parts.

Further, discharge water (condensate water) and exhaust gas (e.g., unreacted hydrogen), which are produced during the operation of the fuel cell stack, may be discharged to the outside through an exhaust pipe.

Recently, various attempts have been made to apply the fuel cell system to construction machines (e.g., excavators) as well as passenger vehicles (or commercial vehicles).

Meanwhile, hydrogen may be contained in the exhaust gas discharged from the fuel cell stack (e.g., the exhaust gas discharged during a purge process for adjusting a hydrogen concentration in the fuel cell stack). When a hydrogen concentration in the exhaust gas increases to a certain level or higher, the risk of explosion increases. Accordingly, regulations are defined to force the hydrogen concentration in the exhaust gas discharged from the fuel cell to be at a predetermined level or lower.

The passenger vehicle operates mainly for the purpose of traveling, and it is possible to dilute the exhaust gas (reduce the hydrogen concentration in the exhaust gas) using outside air introduced into the vehicle while the vehicle travels (using vehicle-induced wind introduced when the vehicle travels).

In contrast, in the case of the construction machine used in a stationary state in an indoor construction site such as a construction site in a factory or warehouse, it is difficult to use the vehicle-induced wind, which makes it difficult to sufficiently dilute the exhaust gas. In particular, the exhaust gas stagnates at a particular position (e.g., in a power pack), which causes an increase in the risk of occurrence of an accident (risk of explosion).

Therefore, recently, various studies have been conducted to effectively reduce a hydrogen concentration in the exhaust gas discharged from the fuel cell stack, but the study results are still insufficient. Accordingly, there is a need to develop a technology to effectively reduce the hydrogen concentration in the exhaust gas discharged from the fuel cell stack.

SUMMARY

The present disclosure has been made in an effort to provide a fuel cell system and an air injection device, which are capable of reducing a hydrogen concentration at a target position.

In particular, the present disclosure has been made in an effort to reduce a hydrogen concentration in exhaust gas, which is discharged from a fuel cell stack and then stagnates at a target position, even under a condition in which vehicle-induced wind cannot be used.

The present disclosure has also been made in an effort to simplify a structure and improve spatial utilization and a degree of design freedom.

The present disclosure has also been made in an effort to improve safety and reliability.

The present disclosure has also been made in an effort to simplify a manufacturing process and reduce costs.

The objects to be achieved by the embodiments are not limited to the above-mentioned objects, but also include objects or effects that may be understood from the solutions or embodiments described below.

To achieve the above-mentioned objects of the present disclosure, a first exemplary embodiment of the present disclosure provides a fuel cell system including an air supply line to supply air to a fuel cell stack, a bypass line connected to the air supply line and allows the air to flow to a target position, and a bypass valve to selectively open or close the bypass line.

This is to reduce a hydrogen concentration at the target position (e.g., in an explosion-proof zone).

That is, hydrogen may be contained in the exhaust gas discharged from the fuel cell stack (e.g., the exhaust gas discharged during a purge process for adjusting a hydrogen concentration in the fuel cell stack). When a hydrogen concentration in the exhaust gas increases to a certain level or higher, the risk of explosion increases. Therefore, the hydrogen concentration in the exhaust gas discharged from the fuel cell needs to be maintained at a predetermined level or lower.

The passenger vehicle operates mainly for the purpose of traveling, and it is possible to dilute the exhaust gas using outside air introduced into the vehicle while the vehicle travels (using vehicle-induced wind introduced when the vehicle travels). In contrast, in the case of the construction machine used in a stationary state in an indoor construction site such as a construction site in a factory or warehouse, it is difficult to use the vehicle-induced wind, which makes it difficult to sufficiently dilute the exhaust gas. In particular, the exhaust gas stagnates at a particular position (region), which causes an increase in the risk of occurrence of an accident (risk of explosion).

In contrast, according to the first embodiment of the present disclosure, the air to be supplied to the fuel cell stack is injected, through the bypass line, to the target position at which the exhaust gas may stagnate. Therefore, it is possible to obtain an advantageous effect of reducing the risk of explosion by reducing (diluting) the hydrogen concentration in the exhaust gas that stagnates at the target position (e.g., in an explosion-proof zone), even under the condition in which the vehicle-induced wind cannot be used.

Moreover, according to the first embodiment of the present disclosure, it is not necessary to additionally provide a separate fan (an air supply fan) for forcibly supplying the air to reduce the hydrogen concentration in the exhaust gas discharged from the fuel cell. Therefore, it is possible to obtain an advantageous effect of simplifying the structure and improving the degree of design freedom and the spatial utilization.

According to the first exemplary embodiment of the present disclosure, the fuel cell system may further include an air compressor connected to the air supply line and compresses the air to be supplied to the fuel cell stack.

The bypass valve may have various structures capable of selectively opening or closing the bypass line.

According to the first exemplary embodiment of the present disclosure, the bypass valve may include: a valve housing including a first supply port connected to the air supply line, and a second supply port to communicate with the bypass line; a valve member to be movable from a first position at which the valve member closes the second supply port to a second position at which the valve member opens the second supply port; a solenoid to provide driving power to move the valve member from the second position to the first position; and an elastic member to provide an elastic force to move the valve member to the second position.

According to the first exemplary embodiment of the present disclosure, the valve member may rectilinearly move from the first position to the second position.

According to the first exemplary embodiment of the present disclosure, the fuel cell system may further include a guide protrusion disposed on the valve member, and a guide hole disposed in the valve housing and accommodates the guide protrusion so that the guide protrusion is rectilinearly movable.

As described above, the guide protrusion provided on the valve member rectilinearly moves along the guide hole. Therefore, it is possible to obtain an advantageous effect of inhibiting the unnecessary movement and separation of the valve member and improving the movement stability of the valve member.

According to the first exemplary embodiment of the present disclosure, the fuel cell system may further include a support protrusion disposed on the valve member, and the elastic member may be interposed between the valve housing and the support protrusion.

According to the first exemplary embodiment of the present disclosure, the fuel cell system may further include a valve sealing member to seal a gap between the second supply port and the valve member.

Since the valve sealing member is provided between the second supply port and the valve member as described above, it is possible to obtain an advantageous effect of minimizing a leak of air through the gap between the second supply port and the valve member and improving stability in supplying the air to the bypass line.

According to the first exemplary embodiment of the present disclosure, the fuel cell system may further include a connection adapter including a first connection port to communicate with the second supply port, and a second connection port connected to the bypass line.

In particular, the connection adapter may accommodate the solenoid. Since the solenoid is accommodated in the connection adapter as described above, the solenoid and the connection adapter may be modularized into a single component that may be supplied. Therefore, it is possible to obtain an advantageous effect of simplifying the structure and assembly process.

According to the first exemplary embodiment of the present disclosure, the fuel cell system may further include an adapter sealing member interposed between the valve housing and the connection adapter.

Since the adapter sealing member is provided between the valve housing and the connection adapter as described above, it is possible to obtain an advantageous effect of minimizing a leak of air through the gap between the valve housing and the connection adapter and improving stability in supplying the air to the bypass line.

According to the first exemplary embodiment of the present disclosure, the fuel cell system may further include a buffer member interposed between the solenoid and the valve member.

Since the buffer member is disposed between the solenoid and the valve member as described above, it is possible to obtain an advantageous effect of inhibiting impact and noise that may occur when the solenoid and the valve member come into contact with each other when the solenoid operates.

According to the first exemplary embodiment of the present disclosure, the fuel cell system may further include a nozzle member disposed at an end of the bypass line and injects air to the target position.

According to the first exemplary embodiment of the present disclosure, the fuel cell system may further include an air control valve to selectively block air entering or exiting the fuel cell stack; and a purge valve to selectively open or close a discharge line connected to the fuel cell stack, and when the bypass line is opened, the air control valve and the purge valve may be closed, and the air compressor may operate at supercharging revolutions per minute (RPM) higher than preset reference revolutions per minute (RPM).

As described above, when the bypass line is opened, the air control valve and the purge valve may be closed, and the air compressor may operate at supercharging RPM higher than preset reference RPM. Therefore, it is possible to minimize a decrease in pressure of air supplied through the bypass line and improve efficiency in supplying the air through the bypass line. Therefore, it is possible to obtain an advantageous effect of more quickly and effectively reducing the hydrogen concentration at the target position.

According to a second exemplary embodiment of the present disclosure, an air spreader includes a main spreader body having an air passageway through which air passes, and a rotary nozzle rotatably provided on the main spreader body and having an air injection hole configured to communicate with the air passageway.

This is to reduce a hydrogen concentration at the target position (e.g., in an explosion-proof zone).

That is, hydrogen may be contained in the exhaust gas discharged from the fuel cell stack (e.g., the exhaust gas discharged during a purge process for adjusting a hydrogen concentration in the fuel cell stack). When a hydrogen concentration in the exhaust gas increases to a certain level or higher, the risk of explosion increases. Therefore, the hydrogen concentration in the exhaust gas discharged from the fuel cell needs to be maintained at a predetermined level or lower.

The passenger vehicle operates mainly for the purpose of traveling, and it is possible to dilute the exhaust gas using outside air introduced into the vehicle while the vehicle travels (using vehicle-induced wind introduced when the vehicle travels). In contrast, in the case of the construction machine used in a stationary state in an indoor construction site such as a construction site in a factory or warehouse, it is difficult to use the vehicle-induced wind, which makes it difficult to sufficiently dilute the exhaust gas. In particular, the exhaust gas stagnates at a particular position (region), which causes an increase in the risk of occurrence of an accident (risk of explosion).

However, according to the second embodiment of the present disclosure, the rotary nozzle rotates and injects air to the target position at which exhaust gas may stagnate. Therefore, it is possible to obtain an advantageous effect of reducing the hydrogen concentration in the exhaust gas that stagnates at the target position (e.g., in an explosion-proof zone).

Among other things, according to the second embodiment of the present disclosure, the rotary nozzle rotates (e.g., at 360 degrees) at the target position, such that only the single nozzle (rotary nozzle) may effectively supply (inject) air to a wider section (region), and an effect of stirring the exhaust gas, which stagnates at the target position, by using the air may be implemented. Therefore, it is possible to more effectively reduce (dilute) the hydrogen concentration at the target position.

According to the second exemplary embodiment of the present disclosure, the rotary nozzle is rotated by a propulsive force of the air injected through the air injection hole.

Since the rotary nozzle is rotated by the force (propulsive force) for injecting the air through the air injection holes as described above, it is not necessary to additionally provide a separate motor and a separate rotating device for rotating the rotary nozzle. Therefore, it is possible to obtain an advantageous effect of simplifying the structure and improving the degree of design freedom and spatial utilization.

According to the second exemplary embodiment of the present disclosure, the air injection hole may be disposed on a lateral side of the rotary nozzle and inclined with respect to a reference line passing through a rotation center of the rotary nozzle.

In particular, the air injection holes may be provided in plural, and the plurality of air injection holes may be disposed to be spaced apart from one another in a circumferential direction of the rotary nozzle. The plurality of air injection holes may be disposed symmetrically with respect to the rotation center. Since the plurality of air injection holes is provided symmetrically with respect to the rotation center as described above, it is possible to obtain an advantageous effect of ensuring the propulsive force required to rotate the rotary nozzle and improving rotational stability of the rotary nozzle.

According to the second exemplary embodiment of the present disclosure, the air spreader may include a bearing member configured to support the rotary nozzle on the main spreader body so that the rotary nozzle is rotatable.

For example, the bearing member may include an outer race fixed to the main spreader body, and an inner race rotatably provided in the outer race and mounted on the rotary nozzle.

According to the second exemplary embodiment of the present disclosure, the air spreader may include a fastening boss protruding from one surface of the rotary nozzle that faces the main spreader body. The inner race may be mounted on the fastening boss.

In particular, the air spreader may include: a hook portion provided at an end of the fastening boss and fastened to the inner race while passing through the inner race; and a cut-out slit provided in the fastening boss and disposed adjacent to the hook portion.

According to the second exemplary embodiment of the present disclosure, the air spreader may include a sealing part configured to seal a portion between the main spreader body and the rotary nozzle.

The sealing part may have various structures capable of sealing the gap between the main spreader body and the rotary nozzle.

For example, the sealing part may include: a first sealing member disposed between the fastening boss and an inner peripheral surface of the inner race; and a second sealing member disposed between the rotary nozzle and an end of the inner race.

As described above, according to the second embodiment of the present disclosure, the portion between the main spreader body and the rotary nozzle is sealed by the dual sealing structure including: the first sealing member disposed between the fastening boss and the inner peripheral surface of the inner race; and the second sealing member disposed between the rotary nozzle and the end of the inner race. Therefore, it is possible to obtain an advantageous effect of minimizing a leak of air through the gap between the main spreader body and the rotary nozzle and improving stability and reliability.

Among other things, according to the second embodiment of the present disclosure, the second sealing member is disposed between one surface of the rotary nozzle (one surface facing the main spreader body) and the end of the inner race. Therefore, it is possible to obtain an advantageous effect of inhibiting the air leaking through the cut-out slit from leaking to the outside of the main spreader body.

According to the second exemplary embodiment of the present disclosure, the air spreader may include a bearing locking part provided on the main spreader body and configured to lock the bearing member.

The bearing locking part may have various structures capable of locking the bearing member.

For example, the bearing locking part may include: a stepped portion provided in the main spreader body and configured to support one end of the bearing member; and caulking portions made by partially processing an end of the main spreader body and configured to support the other end of the bearing member.

According to another exemplary embodiment of the present disclosure, the fuel cell system may include: an air supply line configured to supply air to the fuel cell stack; a bypass line connected to the air supply line and configured to selectively allow the air to flow to the target position; and the air spreader connected to the bypass line and configured to inject the air to the target position while rotating.

According to the exemplary embodiment of the present disclosure, the air spreader may include a main spreader body connected to the bypass line and having an air passageway through which air passes, and a rotary nozzle rotatably provided on the main spreader body and having an air injection hole configured to communicate with the air passageway.

According to the exemplary embodiment of the present disclosure, the fuel cell system may include an air compressor connected to the air supply line and configured to compress the air to be supplied to the fuel cell stack.

According to the exemplary embodiment of the present disclosure, the fuel cell system may include a frame member configured to support the fuel cell stack, and the air spreader may be supported on the frame member.

According to the exemplary embodiment of the present disclosure, the fuel cell system may include: a flange portion provided on the outer peripheral surface of the main spreader body and supported on one surface of the frame member; and a fastening member disposed on the other surface of the frame member and fastened to the main spreader body.

According to a third exemplary embodiment of the present disclosure, an air injection device includes: a main nozzle body having an air passageway through which air passes; a ball joint nozzle connected to the main nozzle body, configured to be rotatable about one end of the main nozzle body, and having an air injection hole configured to communicate with the air passageway; and a stopper member configured to selectively lock a posture of the ball joint nozzle with respect to the main nozzle body.

This is to reduce a hydrogen concentration at the target position (e.g., in an explosion-proof zone).

That is, hydrogen may be contained in the exhaust gas discharged from the fuel cell stack (e.g., the exhaust gas discharged during a purge process for adjusting a hydrogen concentration in the fuel cell stack). When a hydrogen concentration in the exhaust gas increases to a certain level or higher, the risk of explosion increases. Therefore, the hydrogen concentration in the exhaust gas discharged from the fuel cell needs to be maintained at a predetermined level or lower.

The passenger vehicle operates mainly for the purpose of traveling, and it is possible to dilute the exhaust gas using outside air introduced into the vehicle while the vehicle travels (using vehicle-induced wind introduced when the vehicle travels). In contrast, in the case of the construction machine used in a stationary state in an indoor construction site such as a construction site in a factory or warehouse, it is difficult to use the vehicle-induced wind, which makes it difficult to sufficiently dilute the exhaust gas. In particular, the exhaust gas stagnates at a particular position (region), which causes an increase in the risk of occurrence of an accident (risk of explosion).

In contrast, according to the third embodiment of the present disclosure, the air is injected to the target position at which the exhaust gas may stagnate in the state in which the posture of the ball joint nozzle is optimized (the posture of the ball joint nozzle that may accurately inject air to the position at which the exhaust gas stagnates). Therefore, it is possible to obtain an advantageous effect of reducing (diluting) the hydrogen concentration in the exhaust gas that stagnates at the target position (e.g., in an explosion-proof zone).

Among other things, according to the third embodiment of the present disclosure, the ball joint nozzle may freely rotate relative to the main nozzle body, such that it is not necessary to additionally provide a bracket having a complicated structure in order to fix the ball joint nozzle in an optimal posture in accordance with a mounting position of the air injection device. Therefore, it is possible to obtain an advantageous effect of simplifying the structure and improving the degree of design freedom and spatial utilization.

The ball joint nozzle may have various structures capable of freely rotating about one end thereof relative to the main nozzle body.

For example, the ball joint nozzle includes: a ball joint part rotatably accommodated in the main nozzle body; and a nozzle part extending from the ball joint part and exposed to the outside of an outlet end of the main nozzle body. The air injection hole may be provided to continuously penetrate the ball joint part and the nozzle part.

The stopper member may have various structures capable of locking the ball joint part.

For example, the stopper member may include: a stopper ring locked to an inner peripheral surface of the main nozzle body and configured to support the ball joint part on the main nozzle body; and a through-hole provided in the stopper ring so that the air injection hole is exposed to the air passageway.

According to the third exemplary embodiment of the present disclosure, the air injection device may include: a first screw thread portion provided on an outer peripheral surface of the stopper ring; and a second screw thread portion provided on the inner peripheral surface of the main nozzle body so as to be screw-fastened to the first screw thread portion.

In particular, tool seating grooves may be provided in the stopper ring, and a tool for rotating the stopper ring may be fastened to the tool seating grooves.

According to the third exemplary embodiment of the present disclosure, the air injection device may include a curved seating portion provided on the other surface of the stopper ring. The ball joint part may be seated on the curved seating portion.

As described above, the ball joint part is seated in the state in which the outer surface of the ball joint part is in close contact with the curved seating portion, such that a contact area between the ball joint part and the stopper ring may increase. Therefore, it is possible to obtain an advantageous effect of more stably maintaining the locked state of the ball joint part and minimizing the inadvertent movement and rotation of the ball joint part.

According to the third exemplary embodiment of the present disclosure, the air injection device may include communication holes provided in the ball joint part so as to communicate with the air injection hole. The communication holes may be exposed to the air passageway.

According to the third embodiment of the present disclosure described above, the communication holes are provided in the ball joint part. Therefore, the air may be stably supplied to the air injection hole through the communication holes even though the inlet of the air injection hole is blocked. Therefore, a rotation angle of the ball joint part may be freely changed without a limitation caused by the blocked air injection hole (a constraint on the rotation angle of the ball joint part).

In particular, the communication hole may be provided in plural, and the plurality of communication holes may be radially disposed around the air injection hole based on the air injection hole.

According to the third exemplary embodiment of the present disclosure, the air injection device may include a sealing member interposed between the ball joint part and the outlet end of the main nozzle body.

As described above, according to the third embodiment of the present disclosure, the sealing member is disposed between the ball joint part and the outlet end of the main nozzle body. Therefore, it is possible to obtain an advantageous effect of minimizing a leak of air through the gap between the ball joint part and the outlet end of the main nozzle body and stably maintaining air injection performance implemented by the nozzle part.

In particular, the sealing member may have a curved close-contact portion being in close contact with the ball joint part.

As described above, the outer surface of the ball joint part is in close contact with the curved close-contact portion, such that a contact area between the ball joint part and the sealing member may increase. Therefore, it is possible to obtain an advantageous effect of more stably maintaining the arrangement state of the ball joint part and further improving the sealing performance implemented by the sealing member.

According to the another exemplary embodiment of the present disclosure, the fuel cell system includes: an air supply line configured to supply air to the fuel cell stack; a bypass line connected to the air supply line and configured to selectively allow the air to flow to the target position; the main nozzle body connected to the bypass line and having the air passageway through which the air passes; the ball joint nozzle connected to the main nozzle body, configured to be rotatable about one end of the main nozzle body, and having the air injection hole configured to communicate with the air passageway; and the stopper member configured to selectively lock a posture of the ball joint nozzle with respect to the main nozzle body.

According to the exemplary embodiment of the present disclosure, the ball joint nozzle includes: a ball joint part rotatably accommodated in the main nozzle body; and a nozzle part extending from the ball joint part and exposed to the outside of the main nozzle body. The air injection hole may be provided to continuously penetrate the ball joint part and the nozzle part.

According to the exemplary embodiment of the present disclosure, the fuel cell system may include an air compressor connected to the air supply line and configured to compress the air to be supplied to the fuel cell stack.

According to the exemplary embodiment of the present disclosure, the fuel cell system may include a frame member configured to support the fuel cell stack, and the air injection device may be supported on the frame member.

According to the exemplary embodiment of the present disclosure, the fuel cell system may include: a flange portion provided on the outer peripheral surface of the main nozzle body and supported on one surface of the frame member; and a fastening member disposed on the other surface of the frame member and fastened to the main nozzle body.

DETAILED DESCRIPTION

Figure 1:
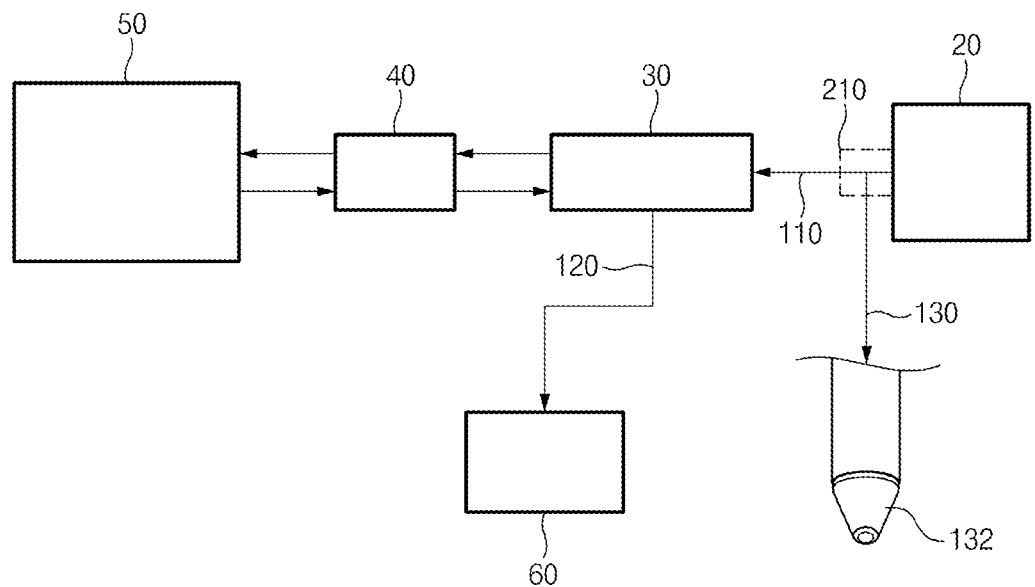
FIG. 1 is a view for explaining a fuel cell system according to a first embodiment of the present disclosure.
Figure 2:
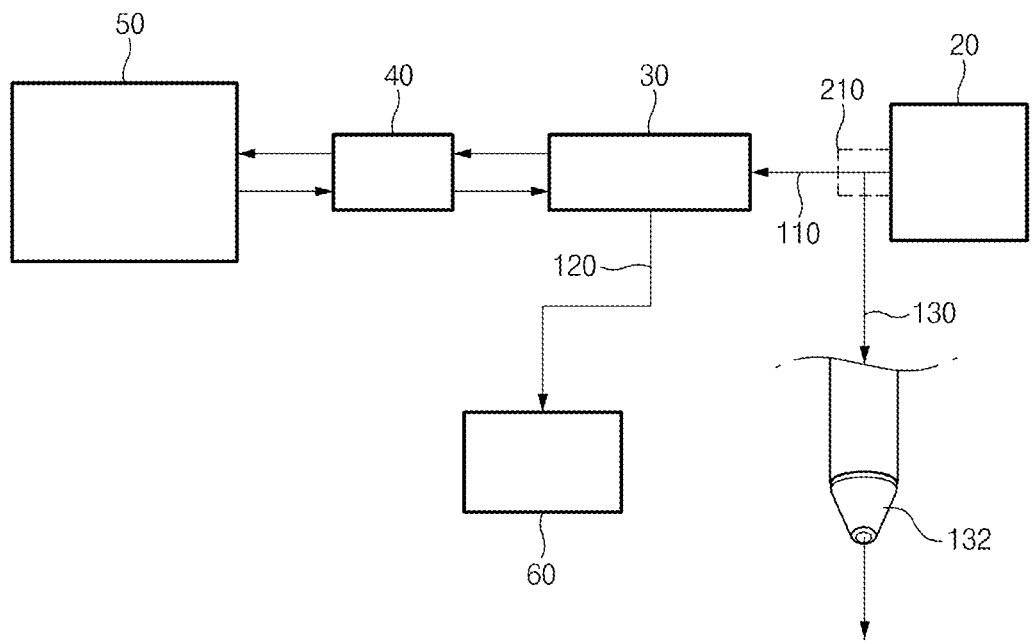
FIG. 2 is a view for explaining a flow path of air along a bypass line in the fuel cell system according to the first embodiment of the present disclosure.

Hereinafter, exemplary embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Referring to FIGS. 1 to 11, a fuel cell system 10 according to a first embodiment of the present disclosure includes an air supply line 110 configured to supply air to a fuel cell stack 50, a bypass line 130 connected to the air supply line 110 and configured to allow air to flow to a target position, and a bypass valve 300 configured to selectively open or close the bypass line 130.

For reference, the fuel cell system 10 according to the first embodiment of the present disclosure may be used to inject air into various target positions at which exhaust gas (e.g., hydrogen) may stagnate. The present disclosure is not restricted or limited by the target position (air injection position).

Hereinafter, an example will be described in which the fuel cell system 10 according to the present disclosure is used to reduce a hydrogen concentration in exhaust gas discharged from the fuel cell system 10 applied to mobility vehicles such as automobiles, ships, and airplanes.

For example, the fuel cell system 10 according to the first embodiment of the present disclosure may be applied to a construction machine (e.g., an excavator).

The air supply line 110 is connected to a fuel cell stack 50 to supply the air to the fuel cell stack 50.

The air supply line 110 may have various structures capable of supplying the air to the fuel cell stack 50. The present disclosure is not restricted or limited by the structure of the air supply line 110.

Referring to FIGS. 1 to 4, according to the first exemplary embodiment of the present disclosure, the fuel cell system 10 may include an air compressor 20 connected to the air supply line 110 and configured to compress the air to be supplied to the fuel cell stack 50.

The air compressor 20 compresses the air supplied through the air supply line 110 and supplies the air to the fuel cell stack 50.

More specifically, the air compressor 20 may compress the air so that the air to be supplied to the fuel cell stack 50 may have a sufficient pressure that enables the air to pass through a flow path in the fuel cell stack 50.

Various air compressors 20 capable of compressing air may be used as the air compressor 20. The present disclosure is not restricted or limited by the type and structure of the air compressor 20. For example, the air compressor 20 may be configured to compress and supply the air using a centrifugal force generated by a rotation of a rotor (not illustrated).

For reference, the fuel cell stack 50 refers to a kind of power generation device that generates electrical energy through a chemical reaction of fuel (e.g., hydrogen), and the fuel cell stack may be configured by stacking several tens or hundreds of fuel cells (unit cells) in series.

The fuel cell may have various structures capable of producing electricity by means of an oxidation-reduction reaction between fuel (e.g., hydrogen) and an oxidant (e.g., air).

For example, the fuel cell may include: a membrane electrode assembly (MEA) (not illustrated) having catalyst electrode layers in which electrochemical reactions occur and which are attached to two opposite sides of an electrolyte membrane through which hydrogen ions move; a gas diffusion layer (GDL) (not illustrated) configured to uniformly distribute reactant gases and transfer generated electrical energy; a gasket (not illustrated) and a fastener (not illustrated) configured to maintain leakproof sealability for the reactant gases and a coolant and maintain an appropriate fastening pressure; and a separator (bipolar plate) (not illustrated) configured to move the reactant gases and the coolant.

More specifically, in the fuel cell, hydrogen, which is fuel, and air (oxygen), which is an oxidant, are supplied to an anode and a cathode of the membrane electrode assembly, respectively, through flow paths in the separator, such that the hydrogen is supplied to the anode, and the air is supplied to the cathode.

The hydrogen supplied to the anode is decomposed into hydrogen ions (protons) and electrons by catalysts in the electrode layers provided at two opposite sides of the electrolyte membrane. Only the hydrogen ions are selectively transmitted to the cathode through the electrolyte membrane, which is a cation exchange membrane, and at the same time, the electrons are transmitted to the cathode through the gas diffusion layer and the separator which are conductors.

At the cathode, the hydrogen ions supplied through the electrolyte membrane and the electrons transmitted through the separator meet oxygen in the air supplied to the cathode by an air supply device, thereby creating a reaction of producing water. As a result of the movement of the hydrogen ions, the electrons flow through external conductive wires, and the electric current is generated as a result of the flow of the electrons.

Meanwhile, the electrolyte membrane of the membrane electrode assembly needs to be maintained at a predetermined humidity or higher so that the fuel cell stack 50 normally operates.

To this end, the air supplied along the air supply line 110 may pass through a humidifier 30, and the air to be supplied to the fuel cell stack 50 along the air supply line 110 may be humidified while passing through the humidifier 30. In this case, the humidification of air is defined as a process of increasing the humidity of the air.

For example, the humidifier 30 may be configured to humidify air (dry air) to be supplied to the fuel cell stack 50 using air (moist air) discharged from the fuel cell stack 50.

The humidifier 30 may have various structures capable of humidifying the dry air using the air (moist air) discharged from the fuel cell stack 50. The present disclosure is not restricted or limited by the structure of the humidifier 30.

According to the first exemplary embodiment of the present disclosure, the humidifier 30 is disposed between an air compressor 20 and the fuel cell stack 50. The humidifier 30 may include an inflow gas connection port (not illustrated) through which inflow gas (dry air) is introduced (supplied), an inflow gas discharge port (not illustrated) through which the (humidified) inflow gas having passed through the interior of the humidifier 30 is discharged, a moist air connection port (not illustrated) through which moist air discharged from the fuel cell stack 50 is supplied, and a moist air discharge port (not illustrated) through which the moist air, which has humidified the inflow gas, is discharged to the outside.

The inflow gas supplied through the inflow gas connection port may be humidified by the moist air while passing through a humidification membrane (e.g., a hollow fiber membrane) (not illustrated) disposed in the humidifier 30. Then, the inflow gas may be supplied to the fuel cell stack 50 through the inflow gas discharge port.

Further, the moist air (or the condensate water) discharged from the fuel cell stack 50 may be supplied to the moist air connection port, humidify the inflow gas in the humidifier 30, and then be discharged to the outside through the moist air discharge port.

According to the first exemplary embodiment of the present disclosure, the fuel cell system 10 may include an air control valve 40 configured to selectively block (control) the air entering and exiting the fuel cell stack 50 (the air to be introduced into the fuel cell stack and the air to be discharged from the fuel cell stack).

Various valves capable of selectively blocking the air entering and exiting the fuel cell stack 50 may be used as the air control valve 40. The present disclosure is not restricted or limited by the type and structure of the air control valve 40. For example, the air control valve 40 may include a first valve member (not illustrated) and a second valve member (not illustrated) that are configured to open or close a first port (not illustrated) through which the air is supplied to the fuel cell stack 50 and a second port (not illustrated) through which the air is discharged from the fuel cell stack 50.

In addition, a discharge line 120 may be connected to the fuel cell stack 50. The exhaust gas (e.g., air and hydrogen) discharged from the fuel cell stack 50 may be discharged to the outside through the discharge line 120.

The discharge line 120 may have various structures capable of guiding the exhaust gas discharged from the fuel cell stack 50. The present disclosure is not restricted or limited by the structure of the discharge line 120.

For example, the exhaust gas discharged along the discharge line 120 may pass through the humidifier 30. The air (dry air) introduced into the humidifier 30 may be humidified by the exhaust gas (moist air contained in the exhaust gas) passing through the humidifier 30.

In addition, a purge valve 60 may be provided in the discharge line and selectively open or close the discharge line.

Various valve means capable of selectively opening or closing the discharge line may be used as the purge valve 60. The present disclosure is not restricted or limited by the type and structure of the purge valve 60. For example, a typical solenoid valve 330, a butterfly valve, or the like may be used as the purge valve 60.

The bypass line 130 serves to selectively allow the air supplied through the air supply line 110 to flow to the preset target position.

This is to reduce the hydrogen concentration in the exhaust gas that stagnates at the target position (e.g., in a power pack).

That is, hydrogen may be contained in the exhaust gas discharged from the fuel cell stack 50 (e.g., the exhaust gas discharged during a purge process for adjusting a hydrogen concentration in the fuel cell stack). When a hydrogen concentration in the exhaust gas increases to a certain level or higher, the risk of explosion increases. Therefore, the hydrogen concentration in the exhaust gas discharged from the fuel cell needs to be maintained at a predetermined level or lower.

In the first embodiment of the present disclosure, the air to be supplied to the fuel cell stack 50 through the air supply line 110 is selectively supplied to the target position through the bypass line 130. Therefore, it is possible to obtain an advantageous effect of reducing the hydrogen concentration in the exhaust gas that stagnates at the target position.

Among other things, in the first embodiment of the present disclosure, the air (e.g., outside fresh air) supplied through the bypass line 130 is supplied to the target position at which the exhaust gas stagnates. Therefore, it is possible to obtain an advantageous effect of reducing the risk of explosion by reducing the hydrogen concentration in the exhaust gas stagnating at the target position even under a condition in which vehicle-induced wind cannot be used (e.g., in a state in which a construction machine is stationary).

In addition, according to the first embodiment of the present disclosure, since the air having passed through the air compressor 20 is supplied through the bypass line 130, it is not necessary to additionally provide a separate fan (an air supply fan) for forcibly supplying the air to reduce the hydrogen concentration at the target position. Therefore, it is possible to obtain an advantageous effect of simplifying the structure and improving the degree of design freedom and spatial utilization.

The bypass valve 300 serves to selectively open or close the bypass line 130. In this case, the configuration in which the bypass line 130 is selectively opened or closed means that a flow of air from the air supply line 110 (e.g., the air compressor) to the bypass line 130 is allowed or blocked.

The bypass valve 300 may have various structures capable of selectively opening or closing the bypass line 130. The present disclosure is not restricted or limited by the type and structure of the bypass valve 300.

According to the first exemplary embodiment of the present disclosure, the bypass valve 300 may include: a valve housing 310 having a first supply port 311 connected to the air supply line 110, and a second supply port 312 configured to communicate with the bypass line 130; a valve member 320 configured to be movable from a first position at which the valve member 320 closes the second supply port 312 to a second position at which the valve member 320 opens the second supply port 312; a solenoid 330 configured to provide driving power to move the valve member 320 from the second position to the first position; and an elastic member 340 configured to provide an elastic force to move the valve member 320 to the second position.

The valve housing 310 may have various structures having the first supply port 311 and the second supply port 312. The present disclosure is not restricted or limited by the structure of the valve housing 310.

For example, the valve housing 310 may have an approximately hollow cylindrical shape. The first supply port 311 may be disposed at one end of the valve housing 310, and the second supply port 312 may be disposed on a lateral surface (outer peripheral surface) of the valve housing 310.

For reference, in the first embodiment of the present disclosure illustrated and described above, the example has been described in which the valve housing 310 is configured as only a single housing member. However, according to another example of the first embodiment of the present disclosure, the valve housing may be configured by using a plurality of housing members.

The valve member 320 is movable from the first position at which the valve member 320 closes the second supply port 312 to the second position at which the valve member 320 opens the second supply port 312.

In this case, the configuration in which the valve member 320 is positioned at the first position means that the valve member 320 is positioned to close the second supply port 312. The configuration in which the valve member 320 is positioned at the second position means that the valve member 320 is positioned to open the second supply port 312.

The valve member 320 may be configured to move from the first position to the second position in various ways in accordance with required conditions and design specifications.

For example, the valve member 320 may rectilinearly move from the first position to the second position (or from the second position to the first position).

According to another example of the first embodiment of the present disclosure, the valve member may rotate from the first position to the second position or move along a curved movement route.

The valve member 320 may have various structures capable of opening or closing the second supply port 312 while rectilinearly moving from the first position to the second position. The present disclosure is not restricted or limited by the structure of the valve member 320.

For example, the valve member 320 may be provided in the form of an approximately hollow cup having a circular cross-section.

According to another example of the first embodiment of the present disclosure, the valve member may be provided in the form of a plate (e.g., circular plate) or a solid block.

Figure 8:
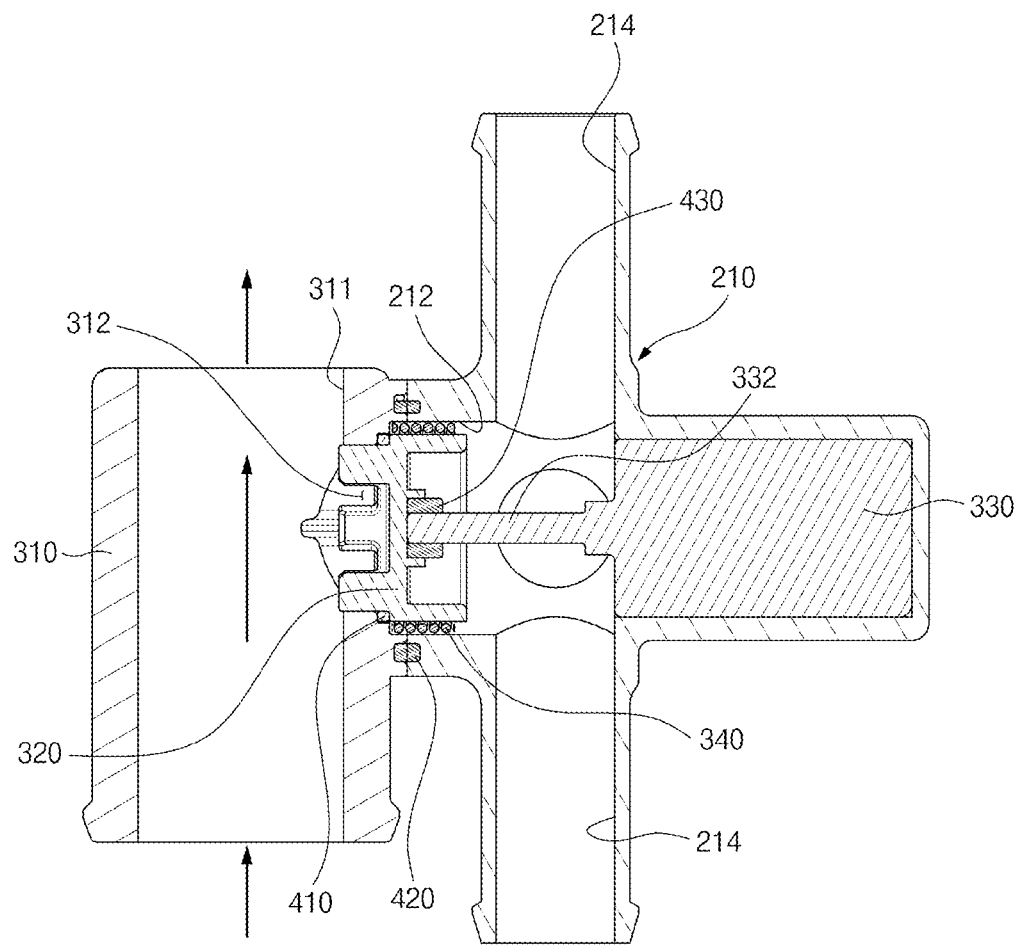
FIG. 8 is a view for explaining a state in which a second supply port is closed in the fuel cell system according to the first embodiment of the present disclosure.

The valve member 320 may close the second supply port 312 in a state in which the valve member 320 is moved to be in close contact with the valve housing 310 (in a state in which the valve member 320 is moved to the left based on FIG. 8). The valve member 320 may open the second supply port 312 in a state in which the valve member 320 is moved to be spaced apart from the valve housing 310 (in a state in which the valve member 320 is moved to the right based on FIG. 9).

According to the first exemplary embodiment of the present disclosure, the fuel cell system 10 may include: guide protrusions 322 provided on the valve member 320; and guide holes 314 provided in the valve housing 310 and configured to accommodate the guide protrusions 322 so that the guide protrusions 322 are rectilinearly movable.

For example, the guide protrusions 322 may protrude from one surface of the valve member 320 that faces the valve housing 310. The guide holes 314 may be provided in an inner peripheral surface of the second supply port 312.

The guide protrusion 322 and the guide hole 314 may be variously changed in structure and number in accordance with required conditions and design specifications. The present disclosure is not restricted or limited by the structure of the guide protrusion 322, the structure of the guide hole 314, the number of (the arrangement interval between) guide protrusions 322, and the number of (the arrangement interval between) guide holes 314.

Hereinafter, an example will be described in which four guide protrusions 322 are disposed to be spaced apart from one another in a circumferential direction of the valve member 320. According to another example of the first embodiment of the present disclosure, three or less guide protrusions may be provided on the valve member, or five or more guide protrusions may be provided on the valve member.

As described above, the guide protrusions 322 provided on the valve member 320 rectilinearly move along the guide holes 314. Therefore, it is possible to obtain an advantageous effect of inhibiting the unnecessary movement (e.g., upward or downward movement based on FIG. 8) and separation of the valve member 320 and improving the movement stability of the valve member 320.

Figure 9:
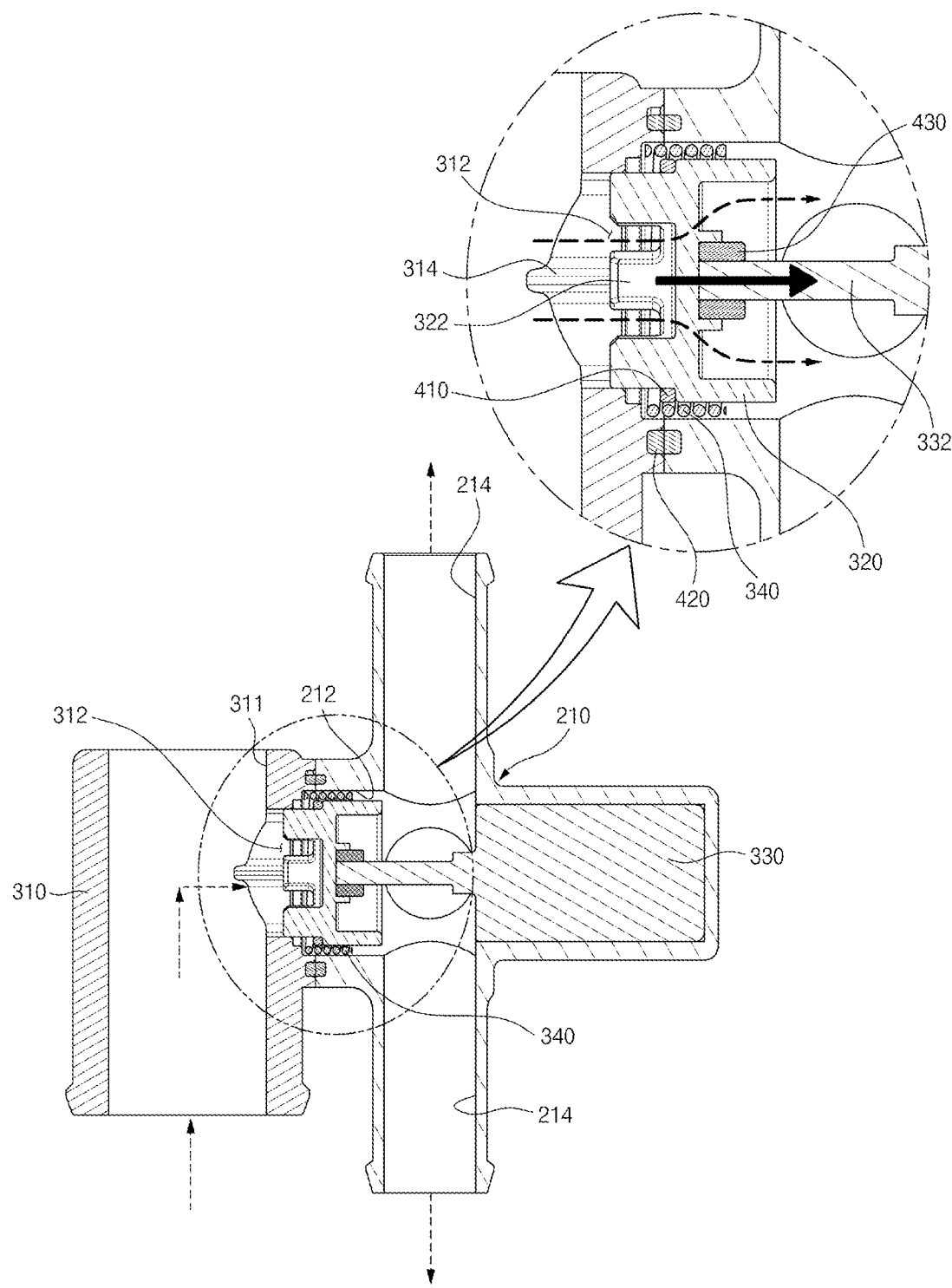
FIG. 9 is a view for explaining a state in which the second supply port is opened in the fuel cell system according to the first embodiment of the present disclosure.

The solenoid 330 serves to provide driving power for moving the valve member 320 from the second position to the first position (e.g., driving power for moving the valve member in a leftward/rightward direction based on FIG. 9).

The solenoid 330 may have various structures capable of providing driving power for moving the valve member 320. The present disclosure is not restricted or limited by the type and structure of the solenoid 330.

For example, the solenoid 330 may include: a bobbin (not illustrated) around which a coil is wound; and a plunger 332 configured to rectilinearly move in the bobbin as power is applied to the coil. The valve member 320 connected to the plunger 332 may be rectilinearly moved by the rectilinear movement of the plunger 332 in the leftward/rightward direction (based on FIG. 9).

For example, when power is applied to the solenoid 330, the valve member 320 may move to the first position and close the second supply port 312. According to another example of the first embodiment of the present disclosure, when the supply of power to the solenoid is cut off, the valve member may move to the first position.

The elastic member 340 serves to provide the elastic force for moving the valve member 320 to the second position (returning the valve member 320 to the position at which the valve member 320 opens the second supply port).

A typical spring may be used as the elastic member 340. The present disclosure is not restricted or limited by the type and structure of the elastic member 340. For example, a typical coil spring may be used as the elastic member 340.

As described above, the valve member 320 is elastically supported by the elastic member 340. Therefore, when the supply of power to the solenoid 330 is cut off, the movement of the valve member 320 is allowed, and the valve member 320 is moved to the second position by the elastic force of the elastic member 340, such that the second supply port 312 may be opened. In this case, the elastic force of the elastic member 340 may maintain the state in which the valve member 320 opens the second supply port 312.

According to the first exemplary embodiment of the present disclosure, the fuel cell system 10 may include support protrusions 324 provided on an outer peripheral surface of an end of the valve member 320. The elastic member 340 may be interposed between the valve housing 310 and the support protrusions 324. That is, one end of the elastic member 340 may be supported on the valve housing 310, and the other end of the elastic member 340 may be supported by the support protrusion 324.

For example, three support protrusions 324 may be provided on the outer peripheral surface of the end of the valve member 320 and spaced apart from one another at equal intervals in the circumferential direction of the valve member 320.

In the first embodiment of the present disclosure illustrated and described above, the example has been described in which the other end of the elastic member 340 is supported by the support protrusions 324 provided on the valve member 320. However, according to another example of the first embodiment of the present disclosure, the other end of the elastic member may be supported by a connection adapter or other support bodies provided on peripheral structures.

According to the first exemplary embodiment of the present disclosure, the fuel cell system 10 may include a valve sealing member 420 configured to seal a gap between the second supply port 312 and the valve member 320.

The valve sealing member 420 may have various structures capable of sealing the gap between the second supply port 312 and the valve member 320. The present disclosure is not restricted or limited by the structure of the valve sealing member 420.

For example, the valve sealing member 420 may be provided in an approximately ring shape and interposed between the second supply port 312 and the valve member 320.

The valve sealing member 420 may be made of an elastic material such as silicone or urethane. The present disclosure is not restricted or limited by the material and properties of the valve sealing member 420.

Since the valve sealing member 420 is provided between the second supply port 312 and the valve member 320 as described above, it is possible to obtain an advantageous effect of minimizing a leak of air through the gap between the second supply port 312 and the valve member 320 and improving stability in supplying the air to the bypass line 130.

The bypass line 130 may be connected in various manners in accordance with required conditions and design specifications. The present disclosure is not restricted or limited by the structure for connecting the bypass line 130.

According to the first exemplary embodiment of the present disclosure, the fuel cell system 10 may include a connection adapter 210, and the bypass line 130 may be connected to the air supply line 110 (e.g., the air compressor) by means of the connection adapter 210.

According to another example of the first embodiment of the present disclosure, the bypass line may be connected directly to the air supply line without separately providing the connection adapter.

The connection adapter 210 may have various structures including a first connection port 212 configured to communicate with the second supply port 312, and a second connection port 214 connected to the bypass line 130. The present disclosure is not restricted or limited by the structure of the connection adapter 210.

The second connection port 214 may have various structures capable of communicating with the first connection port 212.

For example, the first connection port 212 and the second connection port 214 may each have a straight shape. According to another example of the first embodiment of the present disclosure, the first connection port and the second connection port may each have a curved shape or other shapes.

Hereinafter, an example will be described in which three second connection ports 214, which communicate with the first connection port 212, are provided on the connection adapter 210 while defining an approximately 'T' shape.

Figure 3:
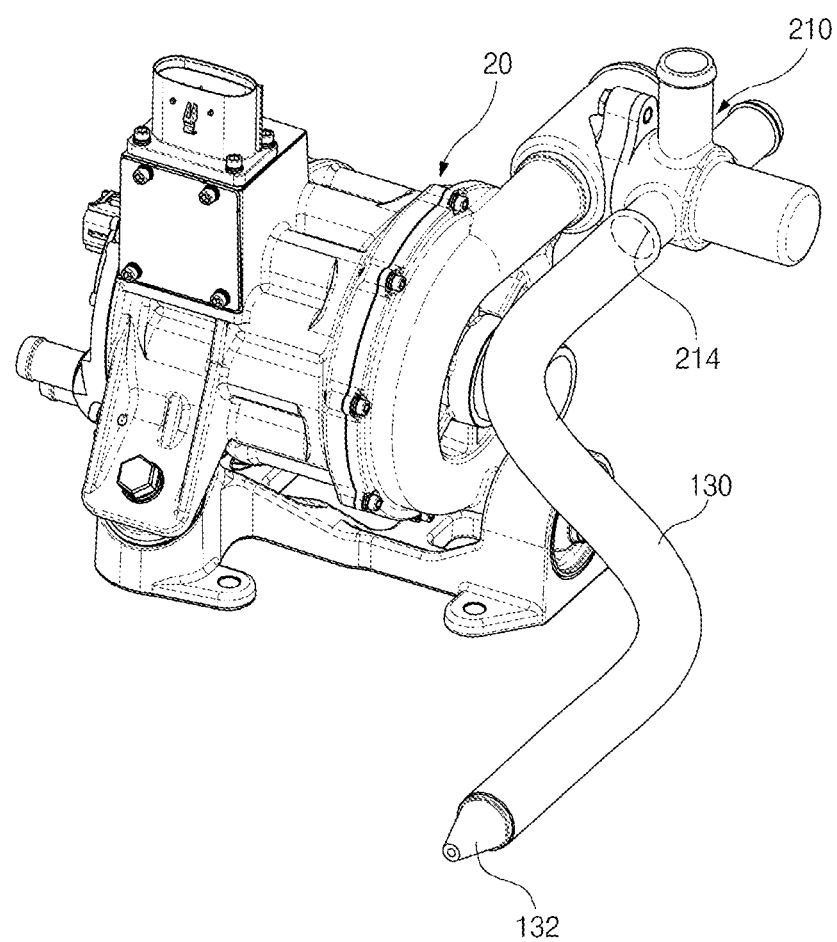
FIG. 3 is a view for explaining an air compressor of the fuel cell system according to the first embodiment of the present disclosure.
Figure 4:
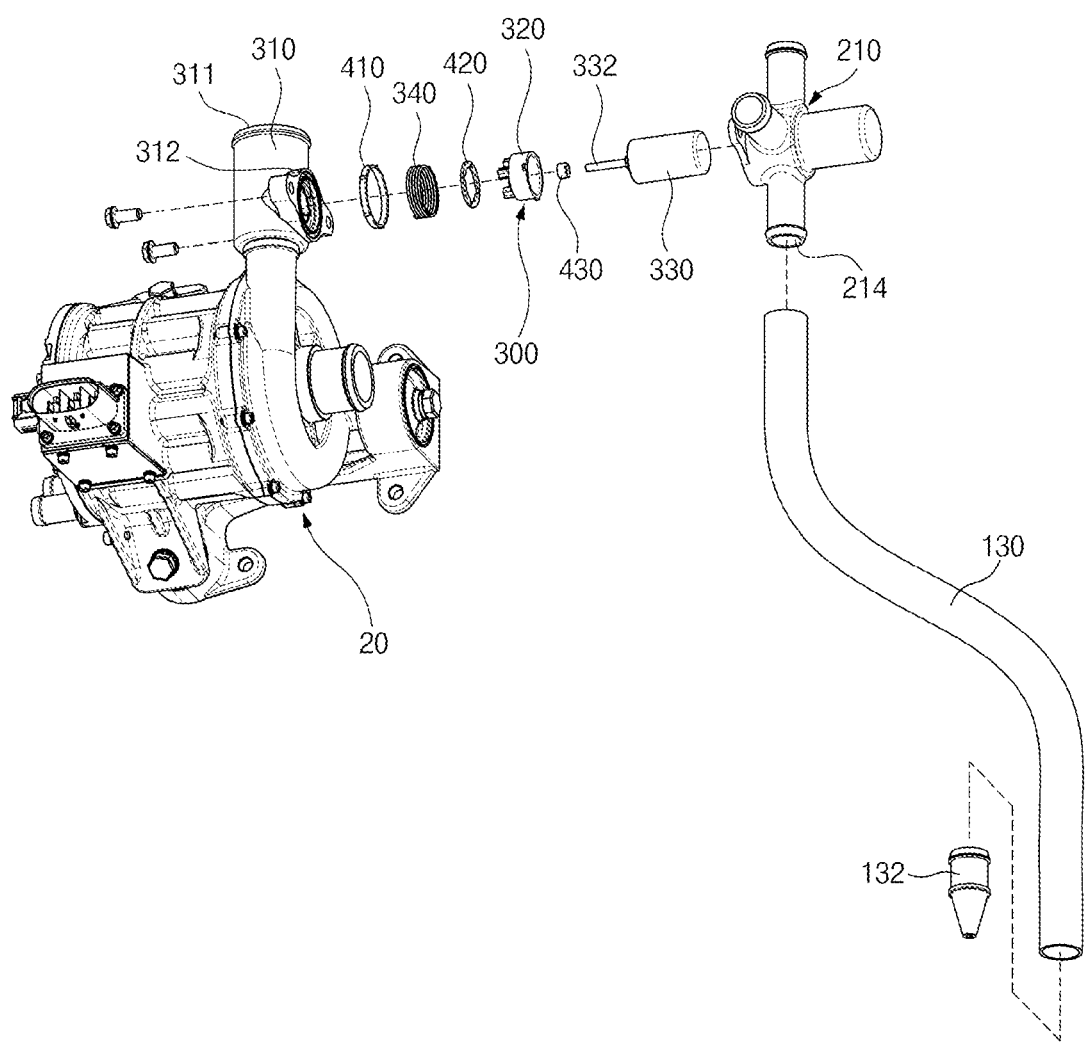
FIG. 4 is a view for explaining a bypass valve of the fuel cell system according to the first embodiment of the present disclosure.
Figure 5:
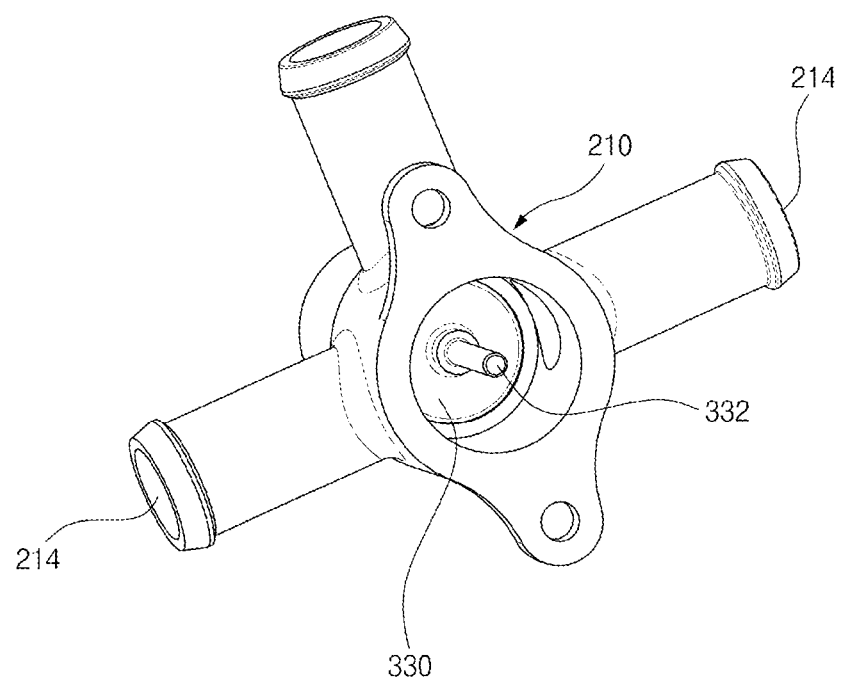
FIG. 5 is a view for explaining a connection adapter of the fuel cell system according to the first embodiment of the present disclosure.
Figure 6:
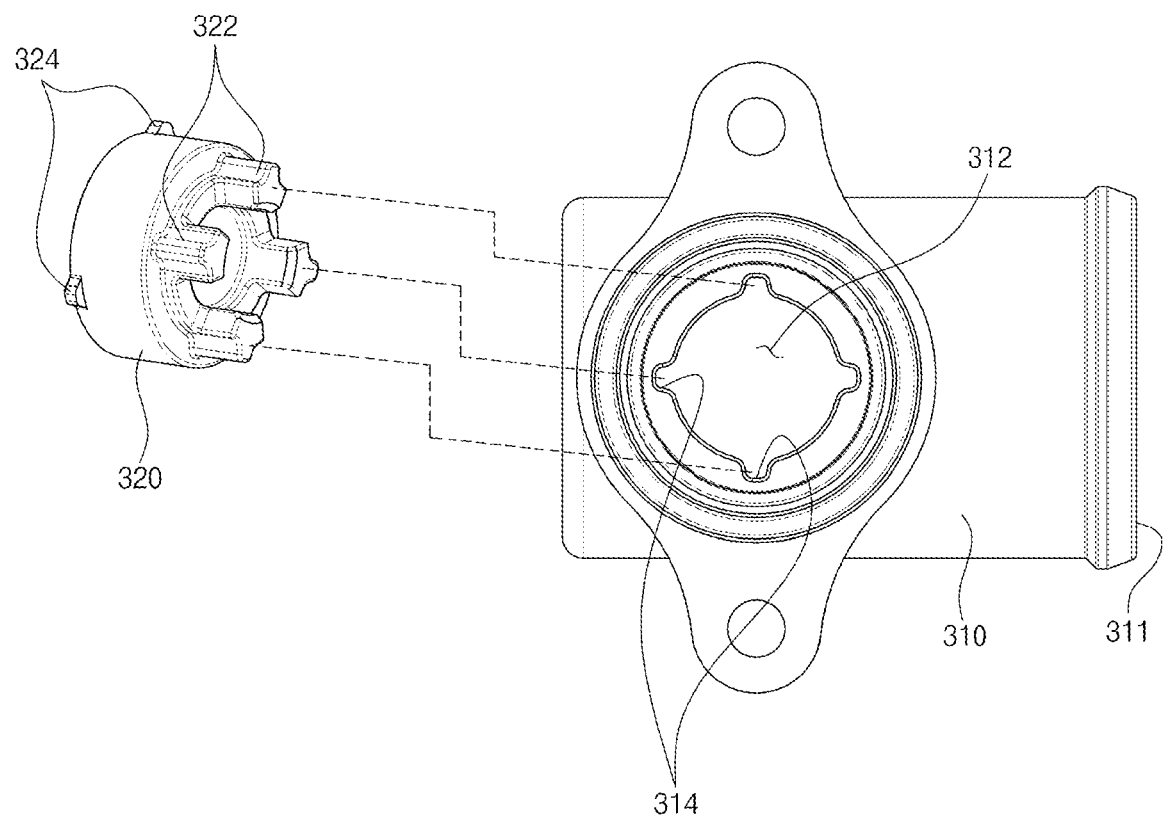
FIG. 6 is a view for explaining a guide protrusion and a guide hole of the fuel cell system according to the first embodiment of the present disclosure.
Figure 7:
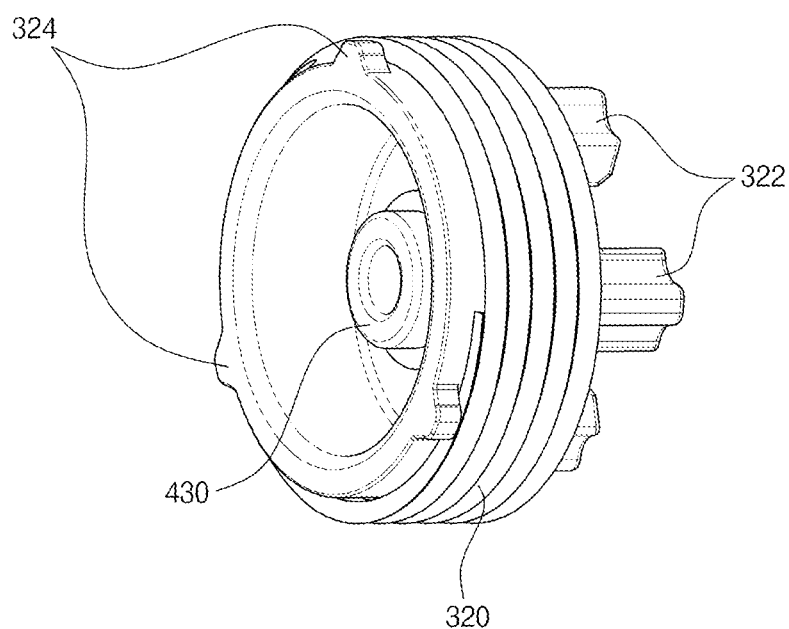
FIG. 7 is a view for explaining a buffer member of the fuel cell system according to the first embodiment of the present disclosure.

For reference, FIGS. 3 and 4 illustrate an example in which the bypass line 130 is connected only to any one of the three second connection ports 214. However, bypass lines 130 may be independently connected to the second connection ports 214, respectively. According to another example of the first embodiment of the present disclosure, one or two second connection ports may be provided on the connection adapter or four or more second connection ports may be provided on the connection adapter.

In particular, an accommodation portion (not illustrated) may be provided in the connection adapter 210, and the solenoid 330 may be accommodated in the connection adapter 210 (in the accommodation portion).

Since the solenoid 330 is accommodated in the connection adapter 210 as described above, the solenoid 330 and the connection adapter 210 may be modularized into a single component that may be supplied. Therefore, it is possible to obtain an advantageous effect of simplifying the structure and assembly process.

According to the first exemplary embodiment of the present disclosure, the fuel cell system 10 may include an adapter sealing member 410 interposed between the valve housing 310 and the connection adapter 210.

The adapter sealing member 410 may have various structures capable of sealing a gap between the valve housing 310 and the connection adapter 210. The present disclosure is not restricted or limited by the structure of the adapter sealing member 410.

For example, the adapter sealing member 410 may have an approximately ring shape and be interposed between the valve housing 310 and the connection adapter 210. In particular, seating grooves (not illustrated) may be provided in a surface of the valve housing 310 and a surface of the connection adapter 210 that face each other. The adapter sealing member 410 may be accommodated in the seating grooves.

The adapter sealing member 410 may be made of an elastic material such as silicone or urethane. The present disclosure is not restricted or limited by the material and properties of the adapter sealing member 410.

Since the adapter sealing member 410 is provided between the valve housing 310 and the connection adapter 210 as described above, it is possible to obtain an advantageous effect of minimizing a leak of air through the gap between the valve housing 310 and the connection adapter 210 and improving stability in supplying the air to the bypass line 130.

In particular, a plurality of catching protrusions (not illustrated) may be provided on an outer peripheral surface of the adapter sealing member 410. Since the catching protrusions are provided on the outer peripheral surface of the adapter sealing member 410 as described above, it is possible to obtain an advantageous effect of minimizing the inadvertent movement and separation of the adapter sealing member 410 between the valve housing 310 and the connection adapter 210.

According to the first exemplary embodiment of the present disclosure, the fuel cell system 10 may include a buffer member 430 (damping member) interposed between the solenoid 330 and the valve member 320.

More specifically, the buffer member 430 may be interposed between the plunger 332 and the valve member 320. For example, the buffer member 430 may be provided in the form of a hollow ring. The buffer member 430 may be accommodated in a seating groove (not illustrated) provided in an inner surface of the valve member 320 in a state in which the buffer member is assembled to surround an end of the plunger 332.

The buffer member 430 may be made of an elastic material such as silicone or urethane. The present disclosure is not restricted or limited by the material and properties of the buffer member 430.

Since the buffer member 430 is provided between the solenoid 330 and the valve member 320 as described above, it is possible to obtain an advantageous effect of inhibiting impact and noise that may occur when the plunger 332 and the valve member 320 come into contact with each other when the plunger 332 operates (rectilinearly moves).

According to the first exemplary embodiment of the present disclosure, the fuel cell system 10 may include a nozzle member 132 disposed at an end (e.g., distal end) of the bypass line 130 and configured to inject the air to the target position.

A typical nozzle capable of injecting air may be used as the nozzle member 132. The present disclosure is not restricted or limited by the type and structure of the nozzle member 132.

For example, an approximately conical nozzle, which has a diameter that gradually decreases in a direction from an inlet to the outlet, may be used as the nozzle member 132.

Figure 10:
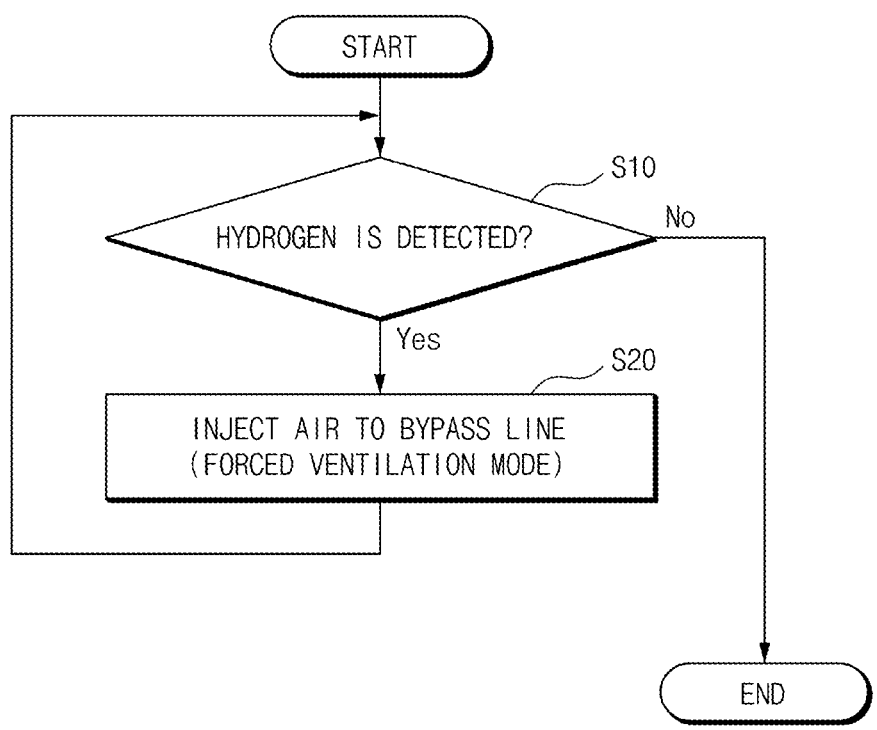
FIG. 10 is a flowchart for explaining a method of controlling the fuel cell system according to the first embodiment of the present disclosure.
Figure 11:
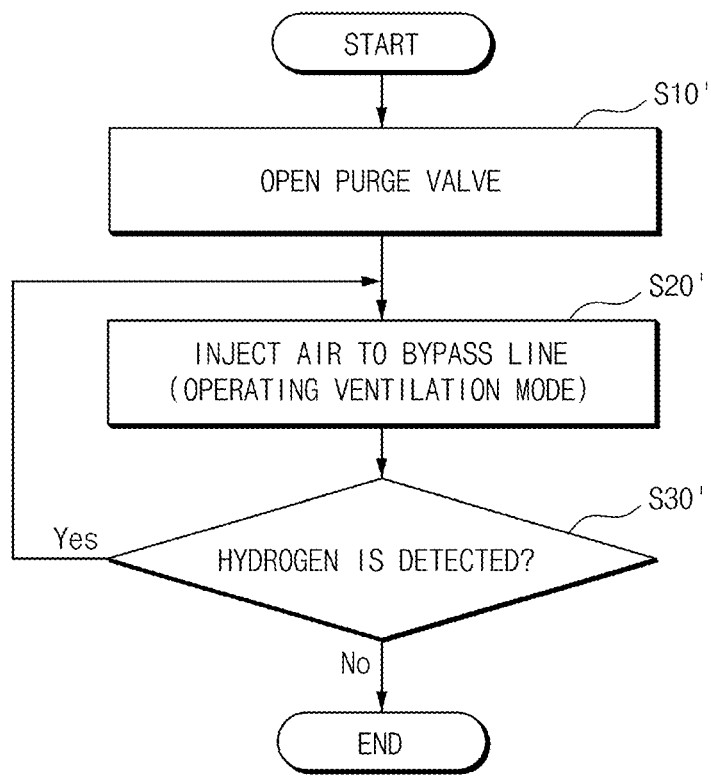
FIG. 11 is a flowchart for explaining a method of controlling the fuel cell system according to another example of the first embodiment of the present disclosure.

Meanwhile, FIG. 10 is a flowchart for explaining a method of controlling the fuel cell system according to the first embodiment of the present disclosure, and FIG. 11 is a flowchart for explaining a method of controlling the fuel cell system according to another example of the first embodiment of the present disclosure.

Further, the parts identical and equivalent to the parts in the above-mentioned configuration will be designated by the identical or equivalent reference numerals, and detailed descriptions thereof will be omitted.

Referring to FIG. 10, the method of controlling the fuel cell system according to the first exemplary embodiment of the present disclosure may include: step S10 of detecting a hydrogen concentration at the target position when the fuel cell stack 50 is turned on; and step (forced ventilation mode) S20 of injecting air to the target position through the bypass line 130 when the hydrogen concentration at the target position is higher than a preset reference concentration.

First, the hydrogen concentration at the target position is detected when the fuel cell stack 50 is turned on (S10).

Next, when the detection (determination) result indicates that the hydrogen concentration at the target position is higher than the preset reference concentration, the forced ventilation mode may be performed while forcibly injecting air to the target position (S20).

For reference, in the first embodiment of the present disclosure, the forced ventilation mode may be understood as a mode for forcibly injecting air to the target position through the bypass line 130.

That is, in step S20 of injecting air to the target position, the supply of power to the solenoid 330 is cut off, and the valve member 320 is moved to the second position by the elastic force of the elastic member 340, such that the second supply port 312 may be opened, and the air compressed by the air compressor 20 may pass through the second supply port 312 and the second connection port 214 and then be injected to the target position through the bypass line 130.

In particular, in step S20 of injecting the air to the target position, the air compressor 20 may perform a supercharging operation at supercharging RPM higher than the reference RPM, and the air control valve 40 and the purge valve 60 may be closed (the flow of air is blocked). For example, in the step of injecting the air to the target position (forced ventilation mode), the air compressor 20 may operate (perform the supercharging operation) at maximum RPM (e.g., revolutions per minute of a rotor).

As described above, in step S20 of injecting the air to the target position, the air compressor 20 performs the supercharging operation in the state in which the air control valve 40 and the purge valve 60 are closed. Therefore, it is possible to minimize a decrease in pressure of air supplied through the bypass line 130 and improve efficiency in supplying the air through the bypass line 130. Therefore, it is possible to obtain an advantageous effect of more quickly and effectively reducing the hydrogen concentration at the target position.

Meanwhile, when the hydrogen concentration at the target position is lower than the preset reference concentration, the forced ventilation mode may be stopped. That is, when the forced ventilation mode is stopped, the air control valve 40 and the purge valve 60 may be opened (the flow of air may be allowed), and the air compressor 20 may return to a normal operation mode (the RPM may decrease to the reference RPM).

Referring to FIG. 11, according to another example of the first exemplary embodiment of the present disclosure, a method of controlling the fuel cell system may include step S10' of opening the purge valve 60 when the fuel cell stack 50 operates, and step S20' of injecting air to the target position through the bypass line 130.

First, the purge valve 60 is opened when the fuel cell stack 50 operates (S10').

For reference, in the first embodiment of the present disclosure, the process in which the purge valve 60 is opened may be understood as a purge process of discharging hydrogen remaining in the fuel cell stack 50 in order to adjust the hydrogen concentration in the fuel cell stack 50.

Next, an operating ventilation mode may be performed while forcibly injecting air to the target position (S20').

In this case, the operating ventilation mode may be understood as a mode for forcibly injecting the air to the target position through the bypass line 130 during the purge process.

That is, in step S20' of injecting air to the target position, the supply of power to the solenoid 330 is cut off, and the valve member 320 is moved to the second position by the elastic force of the elastic member 340, such that the second supply port 312 may be opened, and the air compressed by the air compressor 20 may pass through the second supply port 312 and the second connection port 214 and then be injected to the target position through the bypass line 130.

In particular, in step S20' of injecting the air to the target position, the air compressor 20 may perform a supercharging operation at supercharging RPM higher than the reference RPM, and the air control valve 40 and the purge valve 60 may be closed. For example, in the step of injecting the air to the target position (forced ventilation mode), the air compressor 20 may operate (perform the supercharging operation) at maximum RPM (e.g., revolutions per minute of a rotor).

As described above, in step S20' of injecting the air to the target position, the air compressor 20 performs the supercharging operation in the state in which the air control valve 40 and the purge valve 60 are closed (the flow of air is blocked). Therefore, it is possible to minimize a decrease in pressure of air supplied through the bypass line 130 and improve efficiency in supplying the air through the bypass line 130. Therefore, it is possible to obtain an advantageous effect of more quickly and effectively reducing the hydrogen concentration at the target position.

Next, the hydrogen concentration at the target position is detected (S30'), and the operating ventilation mode may be stopped when the hydrogen concentration of the target position becomes lower than the preset reference concentration. That is, when the operating ventilation mode is stopped, the air control valve 40 and the purge valve 60 may be opened (the flow of air may be allowed), and the air compressor 20 may return to the normal operation mode (the RPM may decrease to the reference RPM). In contrast, when the hydrogen concentration of the target position is higher than the preset reference concentration, the step of injecting the air to the target position may be continuously performed.

Referring to FIGS. 12 to 21, an air spreader 1300 according to a second embodiment of the present disclosure includes: a main spreader body 1310 having an air passageway 1310a through which air passes; and a rotary nozzle 1320 rotatably provided on the main spreader body 1310 and having air injection holes 1322 configured to communicate with the air passageway 1310a.

For reference, the air spreader 1300 according to the second embodiment of the present disclosure may be used to inject air to various target positions TZ. The present disclosure is not restricted or limited by the type and properties of the object to which the air spreader 1300 is applied.

Hereinafter, an example will be described in which the air spreader 1300 according to the present disclosure is used to reduce a hydrogen concentration in exhaust gas discharged from the fuel cell system 10 applied to mobility vehicles such as automobiles, ships, and airplanes.

For example, the fuel cell system 10 according to the second embodiment of the present disclosure may be applied to a construction machine (e.g., an excavator).

Figure 12:
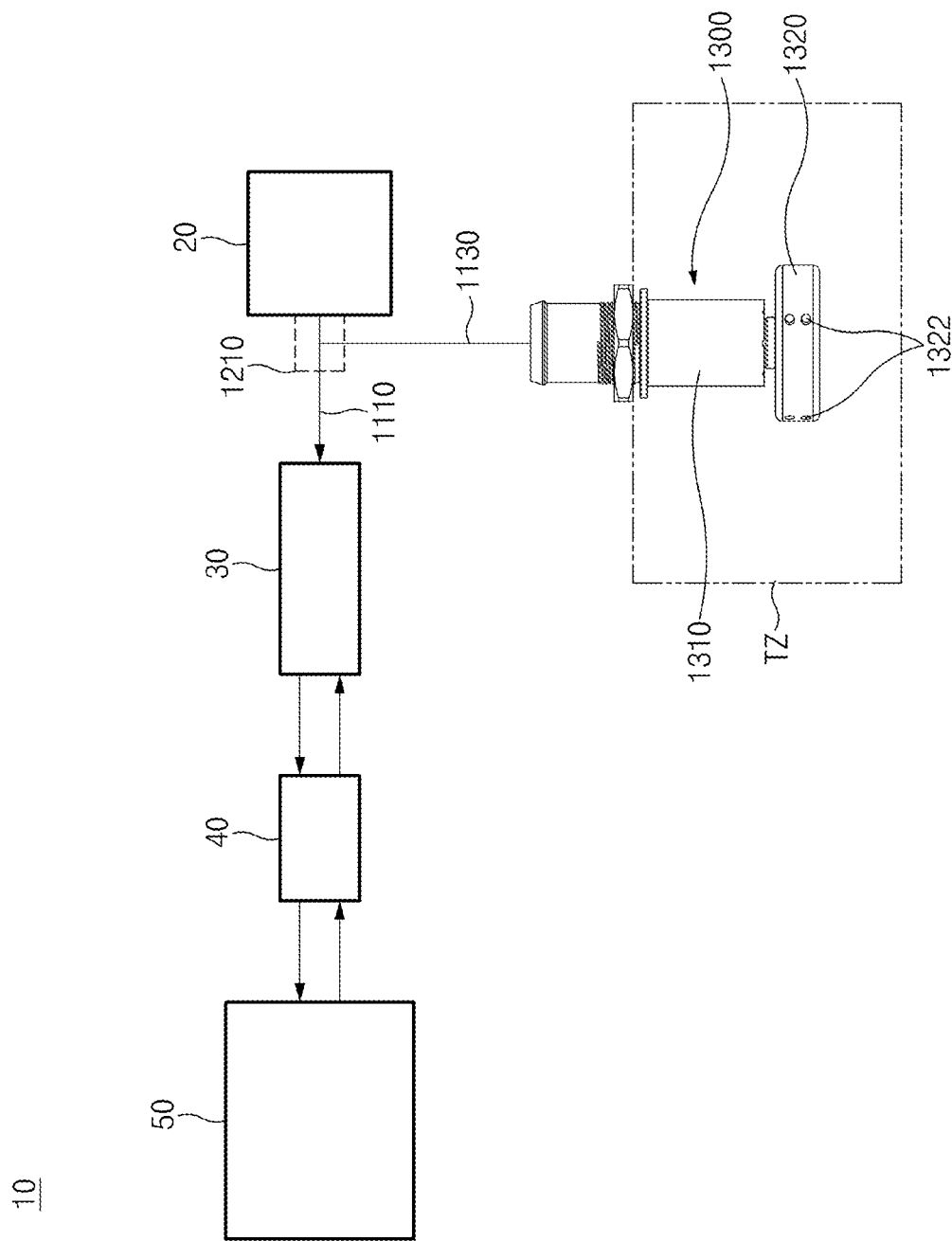
FIG. 12 is a view for explaining a fuel cell system according to a second embodiment of the present disclosure.
Figure 13:
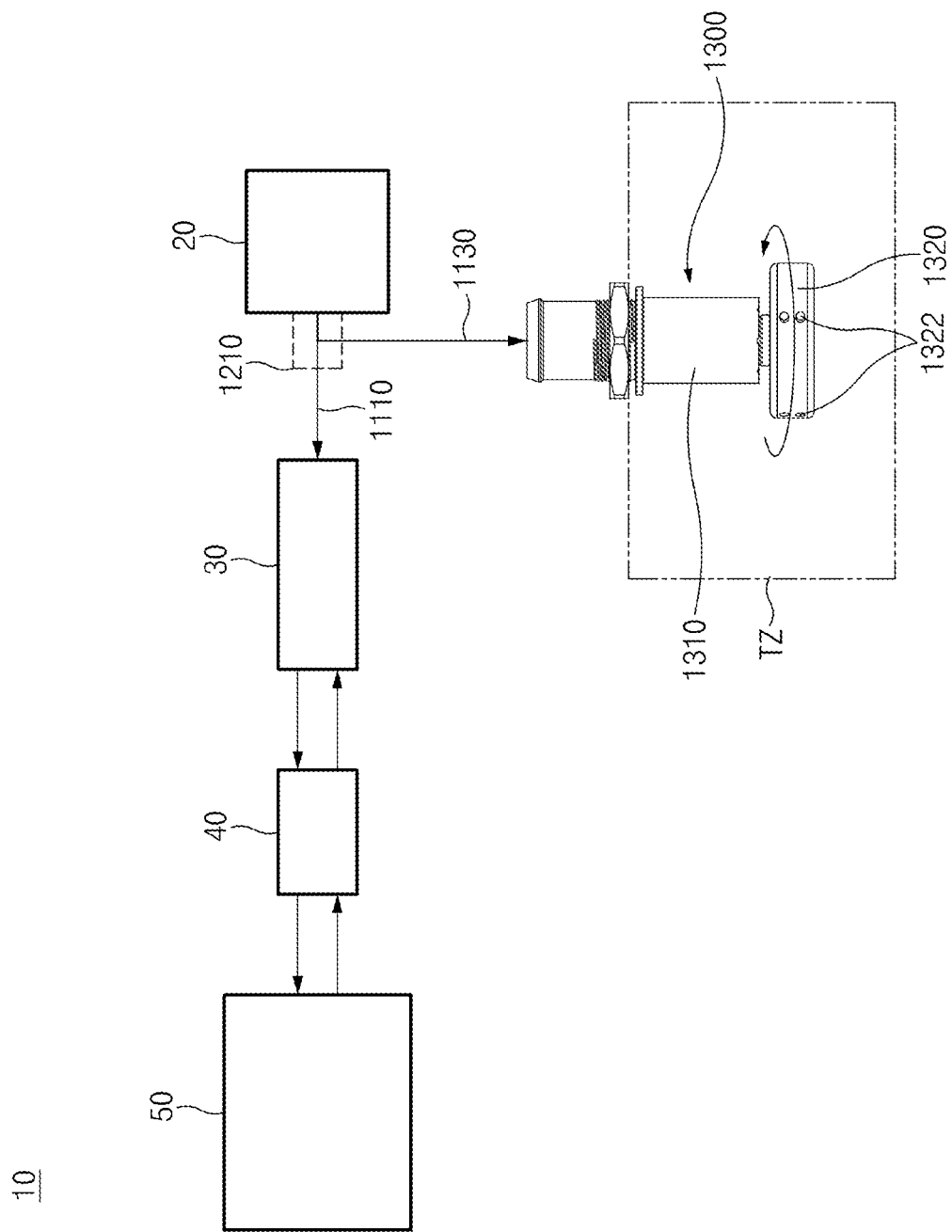
FIG. 13 is a view for explaining a flow path of air along a bypass line in the fuel cell system according to the second embodiment of the present disclosure.

Referring to FIGS. 12 and 13, according to the second exemplary embodiment of the present disclosure, the fuel cell system 10 includes: an air supply line 1110 configured to supply air to the fuel cell stack 50; a bypass line 1130 connected to the air supply line 1110 and configured to selectively allow the air to flow to the target position TZ; and the air spreader 1300 connected to the bypass line 1130 and configured to inject the air to the target position TZ while rotating.

The air supply line 1110 is connected to a fuel cell stack 50 to supply the air to the fuel cell stack 50.

The air supply line 1110 may have various structures capable of supplying the air to the fuel cell stack 50. The present disclosure is not restricted or limited by the structure of the air supply line 1110.

According to the second exemplary embodiment of the present disclosure, the fuel cell system 10 may include an air compressor 20 connected to the air supply line 1110 and configured to compress the air to be supplied to the fuel cell stack 50.

The air compressor 20 compresses the air supplied through the air supply line 1110 and supplies the air to the fuel cell stack 50.

More specifically, the air compressor 20 may compress the air so that the air to be supplied to the fuel cell stack 50 may have a sufficient pressure that enables the air to pass through a flow path in the fuel cell stack 50.

Various air compressors 20 capable of compressing air may be used as the air compressor 20. The present disclosure is not restricted or limited by the type and structure of the air compressor 20. For example, the air compressor 20 may be configured to compress and supply the air using a centrifugal force generated by a rotation of a rotor (not illustrated).

For reference, the fuel cell stack 50 refers to a kind of power generation device that generates electrical energy through a chemical reaction of fuel (e.g., hydrogen), and the fuel cell stack may be configured by stacking several tens or hundreds of fuel cells (unit cells) in series.

The fuel cell may have various structures capable of producing electricity by means of an oxidation-reduction reaction between fuel (e.g., hydrogen) and an oxidant (e.g., air).

For example, the fuel cell may include: a membrane electrode assembly (MEA) (not illustrated) having catalyst electrode layers in which electrochemical reactions occur and which are attached to two opposite sides of an electrolyte membrane through which hydrogen ions move; a gas diffusion layer (GDL) (not illustrated) configured to uniformly distribute reactant gases and transfer generated electrical energy; a gasket (not illustrated) and a fastener (not illustrated) configured to maintain leakproof sealability for the reactant gases and a coolant and maintain an appropriate fastening pressure; and a separator (bipolar plate) (not illustrated) configured to move the reactant gases and the coolant.

More specifically, in the fuel cell, hydrogen, which is fuel, and air (oxygen), which is an oxidant, are supplied to an anode and a cathode of the membrane electrode assembly, respectively, through flow paths in the separator, such that the hydrogen is supplied to the anode, and the air is supplied to the cathode.

The hydrogen supplied to the anode is decomposed into hydrogen ions (protons) and electrons by catalysts in the electrode layers provided at two opposite sides of the electrolyte membrane. Only the hydrogen ions are selectively transmitted to the cathode through the electrolyte membrane, which is a cation exchange membrane, and at the same time, the electrons are transmitted to the cathode through the gas diffusion layer and the separator which are conductors.

At the cathode, the hydrogen ions supplied through the electrolyte membrane and the electrons transmitted through the separator meet oxygen in the air supplied to the cathode by an air supply device, thereby creating a reaction of producing water. As a result of the movement of the hydrogen ions, the electrons flow through external conductive wires, and the electric current is generated as a result of the flow of the electrons.

Meanwhile, the electrolyte membrane of the membrane electrode assembly needs to be maintained at a predetermined humidity or higher so that the fuel cell stack 50 normally operates.

To this end, the air supplied along the air supply line 1110 may pass through a humidifier 30, and the air to be supplied to the fuel cell stack 50 along the air supply line 1110 may be humidified while passing through the humidifier 30. In this case, the humidification of air is defined as a process of increasing the humidity of the air.

For example, the humidifier 30 may be configured to humidify air (dry air) to be supplied to the fuel cell stack 50 using air (moist air) discharged from the fuel cell stack 50.

The humidifier 30 may have various structures capable of humidifying the dry air using the air (moist air) discharged from the fuel cell stack 50. The present disclosure is not restricted or limited by the structure of the humidifier 30.

According to the second exemplary embodiment of the present disclosure, the humidifier 30 is disposed between an air compressor 20 and the fuel cell stack 50. The humidifier 30 may include an inflow gas supply port (not illustrated) through which inflow gas (dry air) is introduced (supplied), an inflow gas discharge port (not illustrated) through which the (humidified) inflow gas having passed through the interior of the humidifier 30 is discharged, a moist air supply port (not illustrated) through which moist air discharged from the fuel cell stack 50 is supplied, and a moist air discharge port (not illustrated) through which the moist air, which has humidified the inflow gas, is discharged to the outside.

The inflow gas supplied through the inflow gas supply port may be humidified by the moist air while passing through a humidification membrane (e.g., a hollow fiber membrane) (not illustrated) disposed in the humidifier 30. Then, the inflow gas may be supplied to the fuel cell stack 50 through the inflow gas discharge port.

Further, the moist air (or the condensate water) discharged from the fuel cell stack 50 may be supplied to the moist air supply port, humidify the inflow gas in the humidifier 30, and then be discharged to the outside through the moist air discharge port.

According to the second exemplary embodiment of the present disclosure, the fuel cell system 10 may include an air control valve 40 configured to control the air entering and exiting the fuel cell stack 50 (the air to be introduced into the fuel cell stack and the air to be discharged from the fuel cell stack).

Various valves capable of selectively blocking the air entering and exiting the fuel cell stack 50 may be used as the air control valve 40. The present disclosure is not restricted or limited by the type and structure of the air control valve 40. For example, the air control valve 40 may include a first valve member (not illustrated) and a second valve member (not illustrated) that are configured to open or close a first port (not illustrated) through which the air is supplied to the fuel cell stack 50 and a second port (not illustrated) through which the air is discharged from the fuel cell stack 50.

In addition, a discharge line (not illustrated) may be connected to the fuel cell stack 50. The exhaust gas (e.g., air and hydrogen) discharged from the fuel cell stack 50 may be discharged to the outside through the discharge line.

For example, the exhaust gas discharged along the discharge line may pass through the humidifier 30. The air (dry air) introduced into the humidifier 30 may be humidified by the exhaust gas (moist air contained in the exhaust gas) passing through the humidifier 30.

The bypass line 1130 serves to selectively allow the air supplied through the air supply line 1110 to flow to the preset target position TZ.

This is to reduce the hydrogen concentration in the exhaust gas that stagnates at the target position TZ (e.g., in a power pack).

That is, hydrogen may be contained in the exhaust gas discharged from the fuel cell stack 50 (e.g., the exhaust gas discharged during a purge process for adjusting a hydrogen concentration in the fuel cell stack). When a hydrogen concentration in the exhaust gas increases to a certain level or higher, the risk of explosion increases. Therefore, the hydrogen concentration in the exhaust gas discharged from the fuel cell needs to be maintained at a predetermined level or lower.

In the second embodiment of the present disclosure, a part of the air to be supplied to the fuel cell stack 50 through the air supply line 1110 is supplied to the target position through the bypass line 1130. Therefore, it is possible to obtain an advantageous effect of reducing the hydrogen concentration in the exhaust gas that stagnates at the target position.

Among other things, in the second embodiment of the present disclosure, the air (e.g., outside fresh air) supplied through the bypass line 1130 is supplied to the target position TZ at which the exhaust gas stagnates. Therefore, it is possible to obtain an advantageous effect of reducing the risk of explosion by reducing the hydrogen concentration in the exhaust gas stagnating at the target position TZ even under a condition in which vehicle-induced wind cannot be used (e.g., in a state in which a construction machine is stationary).

In addition, according to the second embodiment of the present disclosure, since the air having passed through the air compressor 20 is supplied through the bypass line 1130, it is not necessary to additionally provide a separate fan (an air supply fan) for forcibly supplying the air to reduce the hydrogen concentration at the target position TZ. Therefore, it is possible to obtain an advantageous effect of simplifying the structure and improving the degree of design freedom and spatial utilization.

The bypass line 1130 may be connected in various manners in accordance with required conditions and design specifications. The present disclosure is not restricted or limited by the structure for connecting the bypass line 1130.

For example, according to the second exemplary embodiment of the present disclosure, the fuel cell system 10 may include a supply adapter 1210 provided on the air compressor 20. The bypass line 1130 may be connected to the air supply line 1110 through the supply adapter 1210.

A typical flexible tube may be used as the bypass line 1130. The present disclosure is not restricted or limited by the type and properties of the bypass line 1130. According to another example of the second embodiment of the present disclosure, a hard (rigid) tube may be used as the bypass line. Alternatively, the bypass line may be connected directly to the air supply line without separately providing the supply adapter.

The supply adapter 1210 may have various structures capable of being connected to the air compressor 20. The present disclosure is not restricted or limited by the structure and shape of the supply adapter 1210.

Figure 14:
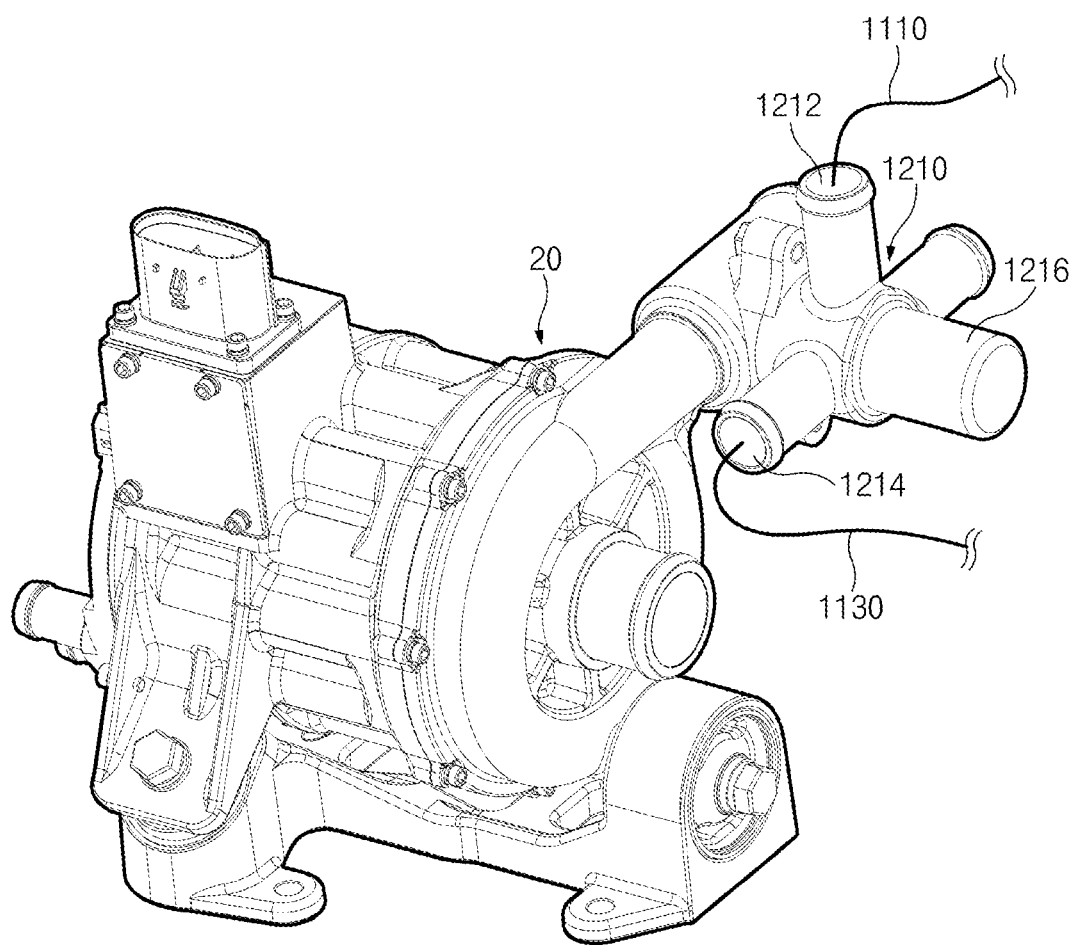
FIG. 14 is a view for explaining a supply adapter of the fuel cell system according to the second embodiment of the present disclosure.
Figure 15:
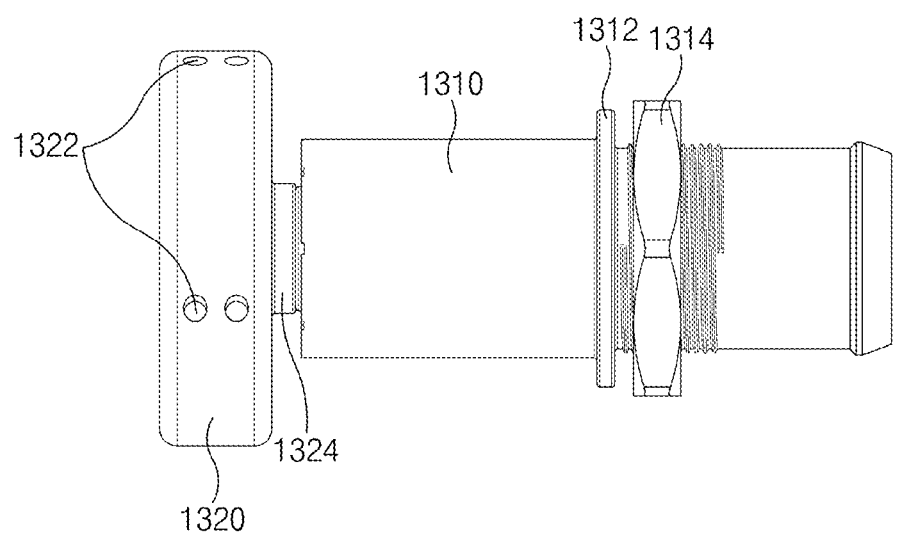
FIG. 15 is a side view for explaining an air spreader according to the second embodiment of the present disclosure.

For example, referring to FIG. 14, the supply adapter 1210 may include a first supply port 1212 configured to communicate with the air supply line 1110, and a second supply port 1214 configured to communicate with the bypass line 1130.

Hereinafter, an example will be described in which a first valve 1216 configured to selectively open or close the second supply port 1214 is integrally provided on a lateral portion of the supply adapter 1210.

Various valve means capable of selectively opening or closing the second supply port 1214 may be used as the first valve 1216. The present disclosure is not restricted or limited by the type and structure of the first valve 1216. For example, a typical solenoid valve or a typical butterfly valve may be used as the first valve 1216.

With this configuration, in a state in which the first valve 1216 closes the second supply port 1214, the air compressed by the air compressor 20 may be supplied to the fuel cell stack 50 through the first supply port 1212. In contrast, in a state in which the first valve 1216 opens the second supply port 1214, a part of the air compressed by the air compressor 20 is supplied to the fuel cell stack 50 through the first supply port 1212, and another part of the air compressed by the air compressor 20 may be supplied to the bypass line 1130 through the second supply port 1214 (see FIG. 13).

Referring to FIGS. 15 to 20, the air spreader 1300 serves to inject the air, which is supplied through the bypass line 1130, to the target position TZ while rotating.

In this case, the configuration in which the air spreader injects the air to the target position TZ while rotating means that the direction in which the air is injected (supplied) to the target position TZ is rotated (e.g., the air injection holes are rotated).

For example, the air spreader 1300 may rotate the air supply direction by 360 degrees. According to another example of the second embodiment of the present disclosure, the air spreader may rotate the air supply direction by 180 degrees or other angles.

As described above, according to the second embodiment of the present disclosure, the air spreader injects the air to the target position TZ while rotating, such that the air may be effectively supplied (injected) to a wider section (region) only by the single air spreader 1300. Therefore, it is possible to obtain an advantageous effect of more effectively reducing (diluting) the hydrogen concentration in the exhaust gas that stagnates at the target position TZ.

The air spreader 1300 may have various structures capable of injecting the air to the target position TZ while rotating. The present disclosure is not restricted or limited by the structure of the air spreader 1300.

For example, the air spreader 1300 may include: the main spreader body 1310 connected to the bypass line 1130 and having the air passageway 1310*a* through which air passes; and the rotary nozzle 1320 rotatably provided on the main spreader body 1310 and having the air injection holes 1322 configured to communicate with the air passageway 1310*a*.

The main spreader body 1310 may have various structures having the air passageway 1310*a*. The present disclosure is not restricted or limited by the structure and shape of the main spreader body 1310.

For example, the main spreader body 1310 may have a hollow cylindrical shape having the air passageway 1310*a* therein. The bypass line 1130 may be connected to one end of the main spreader body 1310, and the rotary nozzle 1320 may be rotatably connected to the other end of the main spreader body 1310.

The rotary nozzle 1320 may have various structures having the air injection holes 1322 configured to communicate with the air passageway 1310*a*. The present disclosure is not restricted or limited by the structure and shape of the rotary nozzle 1320.

For example, the rotary nozzle 1320 may have an approximately disk shape having a predetermined space therein. The air injection holes 1322, which communicate with the air passageway 1310*a*, may be provided in a lateral surface (outer peripheral surface) of the rotary nozzle 1320.

For reference, in the second embodiment of the present disclosure, the example has been described in which the air injection holes 1322 are provided in the lateral surface of the rotary nozzle 1320 (the outer peripheral surface, which is a curved surface). However, according to another example of the second embodiment of the present disclosure, the air injection holes may be provided in other portions of the rotary nozzle (e.g., a top portion of the rotary nozzle).

The rotation of the rotary nozzle 1320 relative to the main spreader body 1310 may be implemented in various ways in accordance with required conditions and design specifications.

In particular, the rotary nozzle 1320 may be configured to be rotated by a propulsive force AM made by the air injected through the air injection holes 1322 (a force for injecting the air).

Since the rotary nozzle 1320 is rotated by the force (propulsive force) for injecting the air through the air injection holes 1322 as described above, it is not necessary to additionally provide a separate motor and a separate rotating device for rotating the rotary nozzle 1320. Therefore, it is possible to obtain an advantageous effect of simplifying the structure and improving the degree of design freedom and spatial utilization.

Figure 20:
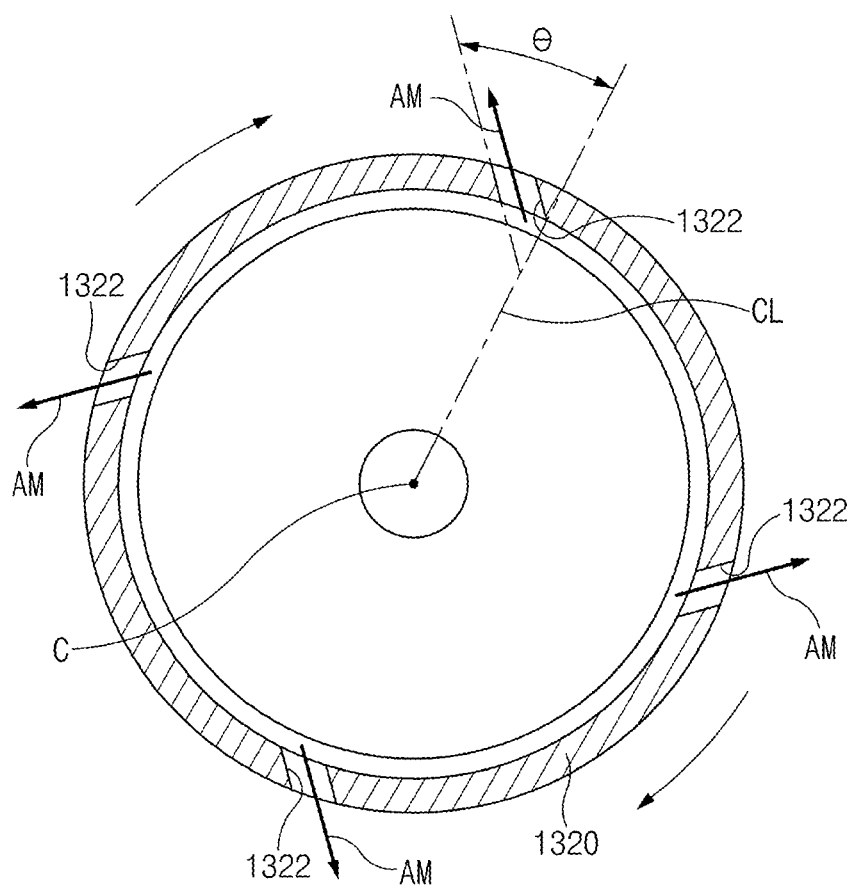
FIG. 20 is a view for explaining a rotary nozzle of the air spreader according to the second embodiment of the present disclosure.

Referring to FIG. 20, according to the second exemplary embodiment of the present disclosure, the air injection holes 1322 may be provided in the lateral surface of the rotary nozzle 1320 and inclined with respect to a reference line CL passing through a rotation center C of the rotary nozzle 1320. The rotary nozzle 1320 may be rotated by the force (propulsive force) generated when the air is injected through the air injection holes 1322.

In this case, an angle $\theta$ of the air injection hole 1322 with respect to the reference line CL may be variously changed within a range in which the propulsive force AM (the force for rotating the rotary nozzle) may be provided. The present disclosure is not restricted or limited by the angle $\theta$ of the air injection hole 1322 with respect to the reference line CL.

The number of air injection holes 1322 and the arrangement interval between the air injection holes 1322 may be variously changed in accordance with required conditions and design specifications.

In particular, the air injection holes 1322 is provided in plural, and the plurality of air injection holes 1322 is disposed to be spaced apart from one another in a circumferential direction of the rotary nozzle 1320. The plurality of air injection holes 1322 may be disposed symmetrically with respect to the rotation center C. Hereinafter, an example will be described in which a total of four air injection holes 1322 are disposed symmetrically with respect to the rotation center C at intervals of 90 degrees.

Since the plurality of air injection holes 1322 is provided symmetrically with respect to the rotation center C as described above, it is possible to obtain an advantageous effect of ensuring the propulsive force AM required to rotate the rotary nozzle 1320 and improving rotational stability of the rotary nozzle 1320.

According to the second exemplary embodiment of the present disclosure, the air spreader 1300 may include a bearing member 1330 configured to support the rotary nozzle 1320 on the main spreader body 1310 so that the rotary nozzle 1320 is rotatable.

The bearing member 1330 serves to smoothly support the rotation of the rotary nozzle 1320 on the main spreader body 1310.

Various bearings (e.g., a ball bearing or a roller bearing), which are capable of supporting the rotary nozzle 1320 so that the rotary nozzle 1320 is rotatable, may be used as the bearing member 1330. The present disclosure is not restricted or limited by the type and structure of the bearing member 1330.

Figure 16:
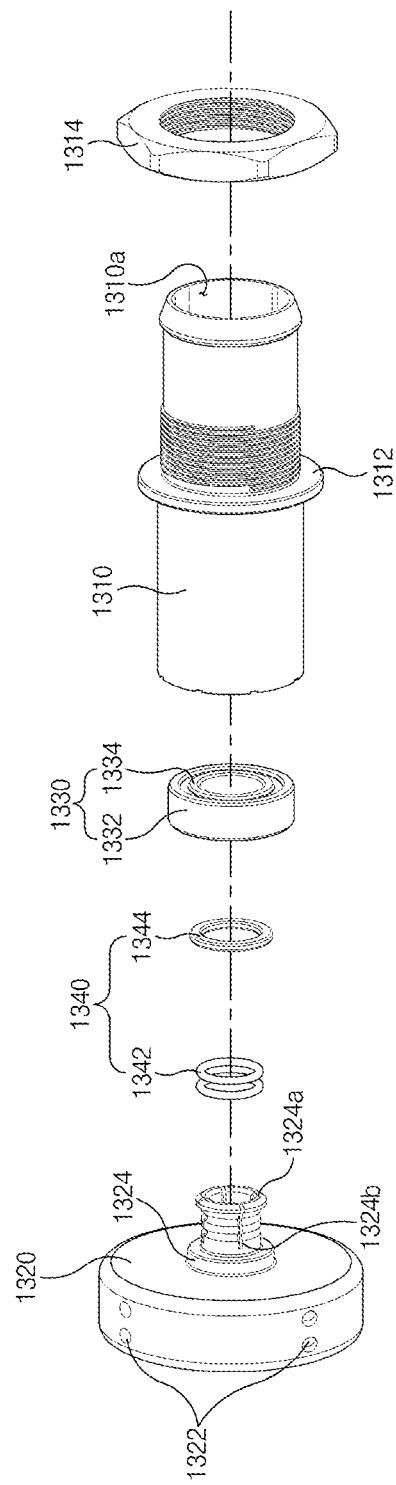
FIG. 16 is an exploded perspective view for explaining the air spreader according to the second embodiment of the present disclosure.
Figure 17:
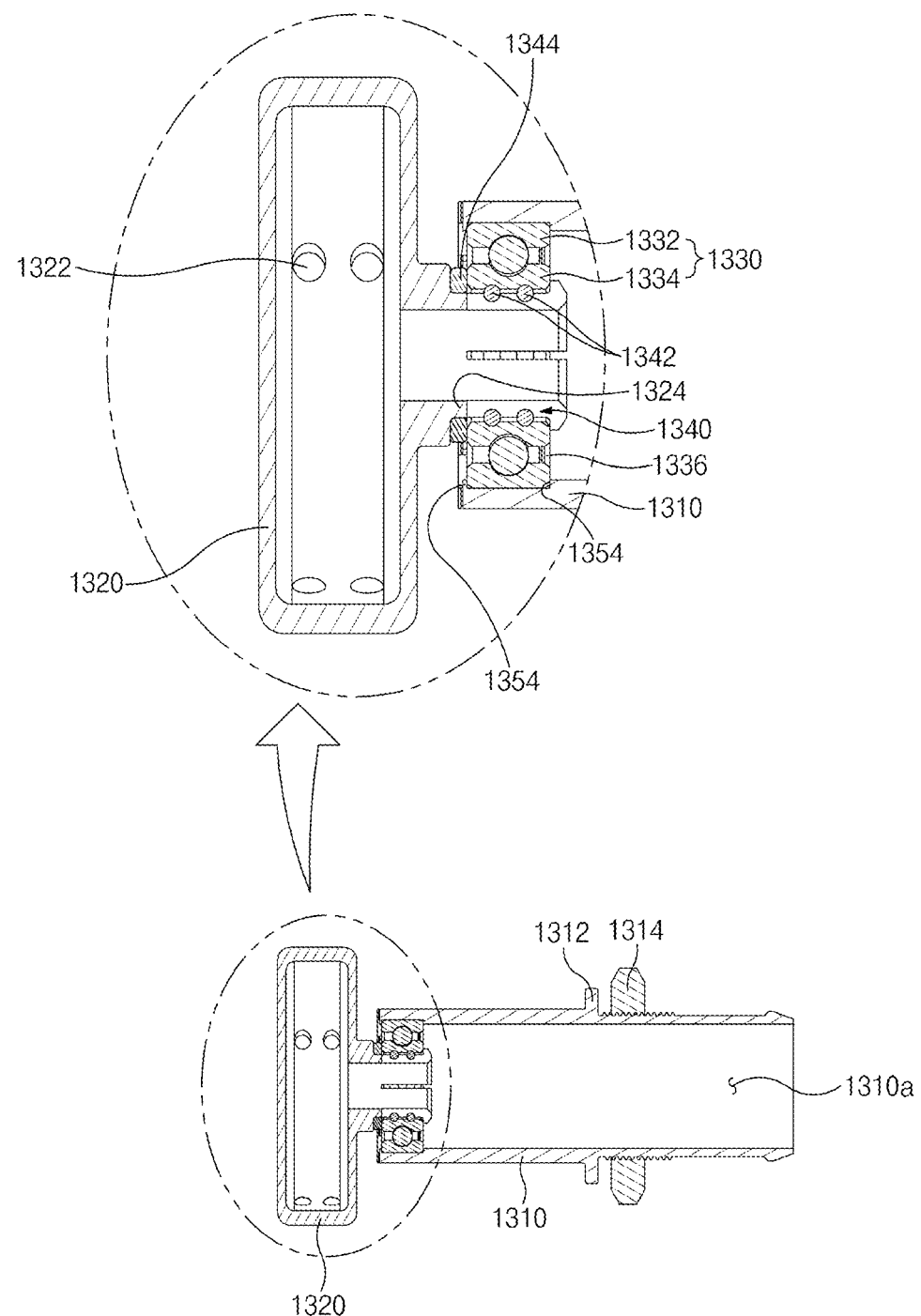
FIG. 17 is a cross-sectional view for explaining the air spreader according to the second embodiment of the present disclosure.

For example, referring to FIGS. 16 and 17, the bearing member 1330 may include an outer race 1332 fixed to the main spreader body 1310, and an inner race 1334 rotatably provided in the outer race 1332 and mounted on the rotary nozzle 1320. Rolling members (not illustrated) such as balls or rollers may be interposed between the outer race 1332 and the inner race 1334.

In particular, the bearing member 1330 may include a bearing sealing member 1336 configured to seal a gap between the outer race 1332 and the inner race 1334.

The bearing sealing member 1336 serves to prevent a leak of air through the gap between the outer race 1332 and the inner race 1334.

The bearing sealing member 1336 may have various structures capable of sealing the gap between the outer race 1332 and the inner race 1334. The present disclosure is not restricted or limited by the structure and material of the bearing sealing member 1336.

For example, the bearing sealing member 1336 may have an approximately ring shape. The bearing sealing member 1336 may be provided on one surface of the bearing member 1330 that faces the main spreader body 1310. The bearing sealing member 1336 may serve to seal the gap between the outer race 1332 and the inner race 1334. According to another example of the second embodiment of the present disclosure, two bearing sealing members may be provided on two opposite sides of the bearing member and used to seal the gap between the outer race and the inner race.

The structure for coupling the bearing member 1330 and the rotary nozzle 1320 may be variously changed in accordance with required conditions and design specifications.

For example, the air spreader 1300 may include a fastening boss 1324 protruding from one surface of the rotary nozzle 1320 that faces the main spreader body 1310. The inner race 1334 may be mounted on the fastening boss 1324.

In particular, the air spreader 1300 may include: a hook portion 1324*a* provided at an end of the fastening boss 1324 and fastened to the inner race 1334 while passing through the inner race 1334; and a cut-out slit 1324*b* provided in the fastening boss 1324 and disposed adjacent to the hook portion 1324*a*.

The hook portion 1324*a* may have various structures capable of being fastened to the end of the inner race 1334 while passing through the inner race 1334. The present disclosure is not restricted or limited by the structure and shape of the hook portion 1324*a*. Since the rotary nozzle 1320 and the inner race 1334 are fastened by means of the hook portion 1324*a* as described above, it is possible to obtain an advantageous effect of more stably maintaining the state in which the rotary nozzle 1320 and the bearing member 1330 are coupled.

The cut-out slit 1324*b* may be made by partially removing (cutting) a part of the fastening boss 1324. The present disclosure is not restricted or limited by the structure and shape of the cut-out slit 1324*b*.

For example, the cut-out slits 1324*b* may be disposed in an axial direction (rectilinear direction) of the fastening boss 1324 and provided at two opposite left and right sides of the hook portion 1324*a* based on the hook portion 1324*a* (two opposite left and right sides of the hook portion in a circumferential direction of the fastening boss).

According to another example of the second embodiment of the present disclosure, the cut-out slit may be provided in a leftward/rightward direction based on the hook portion (in the circumferential direction of the fastening boss) or other directions. Alternatively, the cut-out slit may have a curved shape such as an 'S' shape or a 'C' shape.

Since the cut-out slit 1324*b* is provided at the periphery of the hook portion 1324*a* as described above, it is possible to improve dynamic properties of the hook portion 1324*a* relative to the fastening boss 1324 (the properties of the hook portion that may move relative to the fastening boss in a radial direction of the fastening boss). Therefore, the hook portion 1324*a* may pass through the interior of the inner race 1334 in a state in which the hook portion 1324*a* is elastically bent relative to the fastening boss 1324. After the hook portion 1324*a* passes through the inner race 1334, the hook portion 1324*a* is elastically restored to the initial state (a state before the hook portion 1324*a* is bent). Therefore, the hook portion 1324*a* may be fastened to the end of the inner race 1334 in a kind of snap-fit fastening manner.

According to the second exemplary embodiment of the present disclosure, the air spreader 1300 may include a sealing part 1340 configured to seal a portion between the main spreader body 1310 and the rotary nozzle 1320.

The sealing part 1340 may have various structures capable of sealing a gap between the main spreader body 1310 and the rotary nozzle 1320. The present disclosure is not restricted or limited by the structure of the sealing part 1340.

For example, the sealing part 1340 may include: a first sealing member 1342 disposed between the fastening boss 1324 and an inner peripheral surface of the inner race 1334; and a second sealing member 1344 disposed between the rotary nozzle 1320 and an end of the inner race 1334.

The first sealing member 1342 may have an approximately ring shape and be interposed between an outer peripheral surface of the fastening boss 1324 and the inner peripheral surface of the inner race 1334.

The second sealing member 1344 may have an approximately ring shape and be disposed between one surface of the rotary nozzle 1320 (one surface facing the main spreader body) and the end of the inner race 1334 (the end of the inner race based on the axial direction).

The first sealing member 1342 and the second sealing member 1344 may each be made of an elastic material such as rubber, silicone, or urethane. The present disclosure is not restricted or limited by the materials and properties of the first sealing member 1342 and the second sealing member 1344.

As described above, according to the second embodiment of the present disclosure, the portion between the main spreader body 1310 and the rotary nozzle 1320 is sealed by the dual sealing structure including: the first sealing member 1342 disposed between the fastening boss 1324 and the inner peripheral surface of the inner race 1334; and the second sealing member 1344 disposed between the rotary nozzle 1320 and the end of the inner race 1334. Therefore, it is possible to obtain an advantageous effect of minimizing a leak of air through the gap between the main spreader body 1310 and the rotary nozzle 1320 and improving stability and reliability.

Among other things, according to the second embodiment of the present disclosure, the second sealing member 1344 is disposed between one surface of the rotary nozzle 1320 (one surface facing the main spreader body) and the end of the inner race 1334. Therefore, it is possible to obtain an advantageous effect of inhibiting the air leaking through the cut-out slit 1324*b* from leaking to the outside of the main spreader body 1310.

According to the second exemplary embodiment of the present disclosure, the air spreader 1300 may include a bearing locking part 1350 provided on the main spreader body 1310 and configured to lock the bearing member 1330.

The bearing locking part 1350 serves to stably lock the arrangement state of the bearing member 1330 on the main spreader body 1310.

The bearing locking part 1350 may have various structures capable of locking the bearing member 1330. The present disclosure is not restricted or limited by the structure of the bearing locking part 1350.

Figure 18:
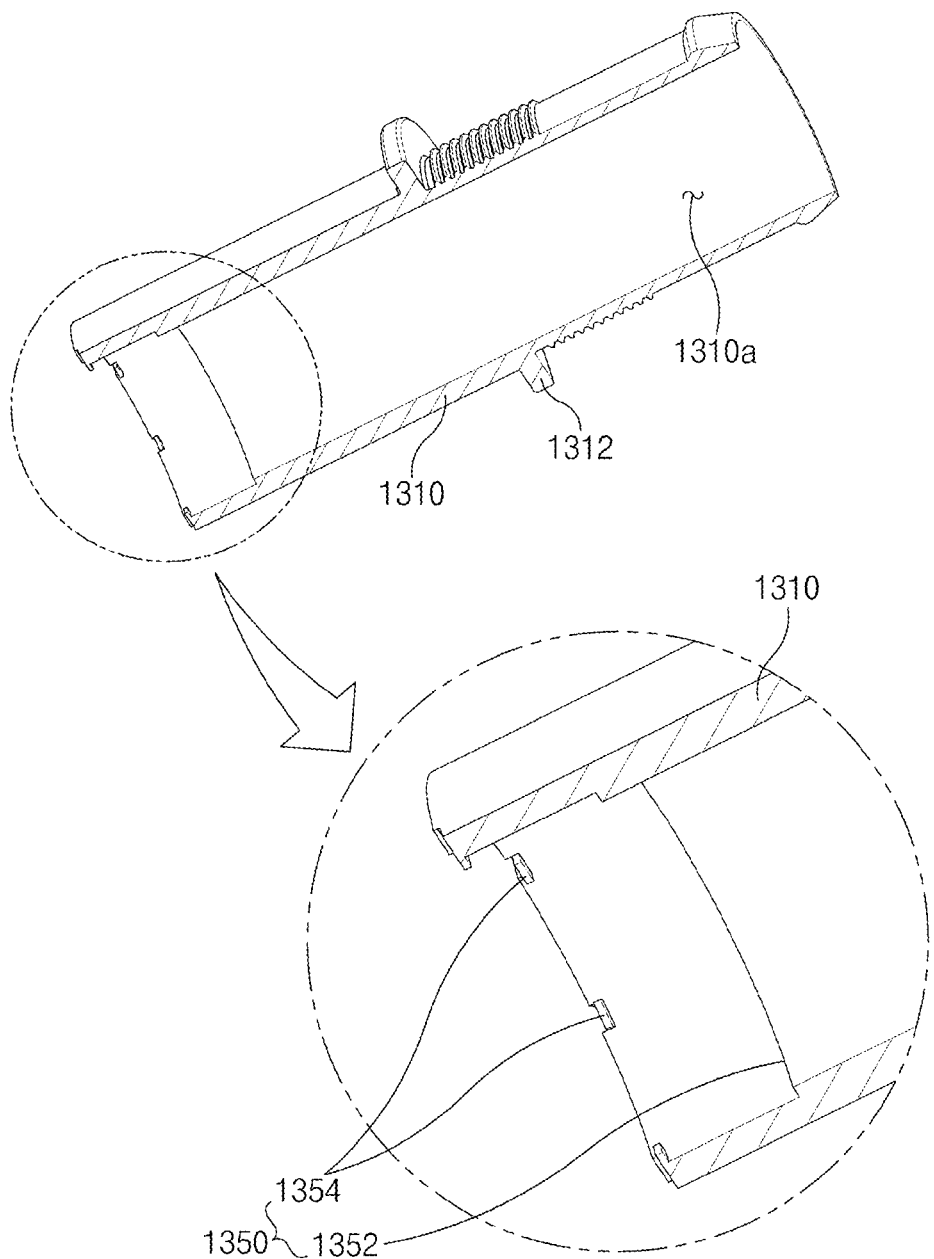
FIGS. 18 and 19 are views for explaining a bearing locking part of the air spreader according to the second embodiment of the present disclosure.
Figure 19:
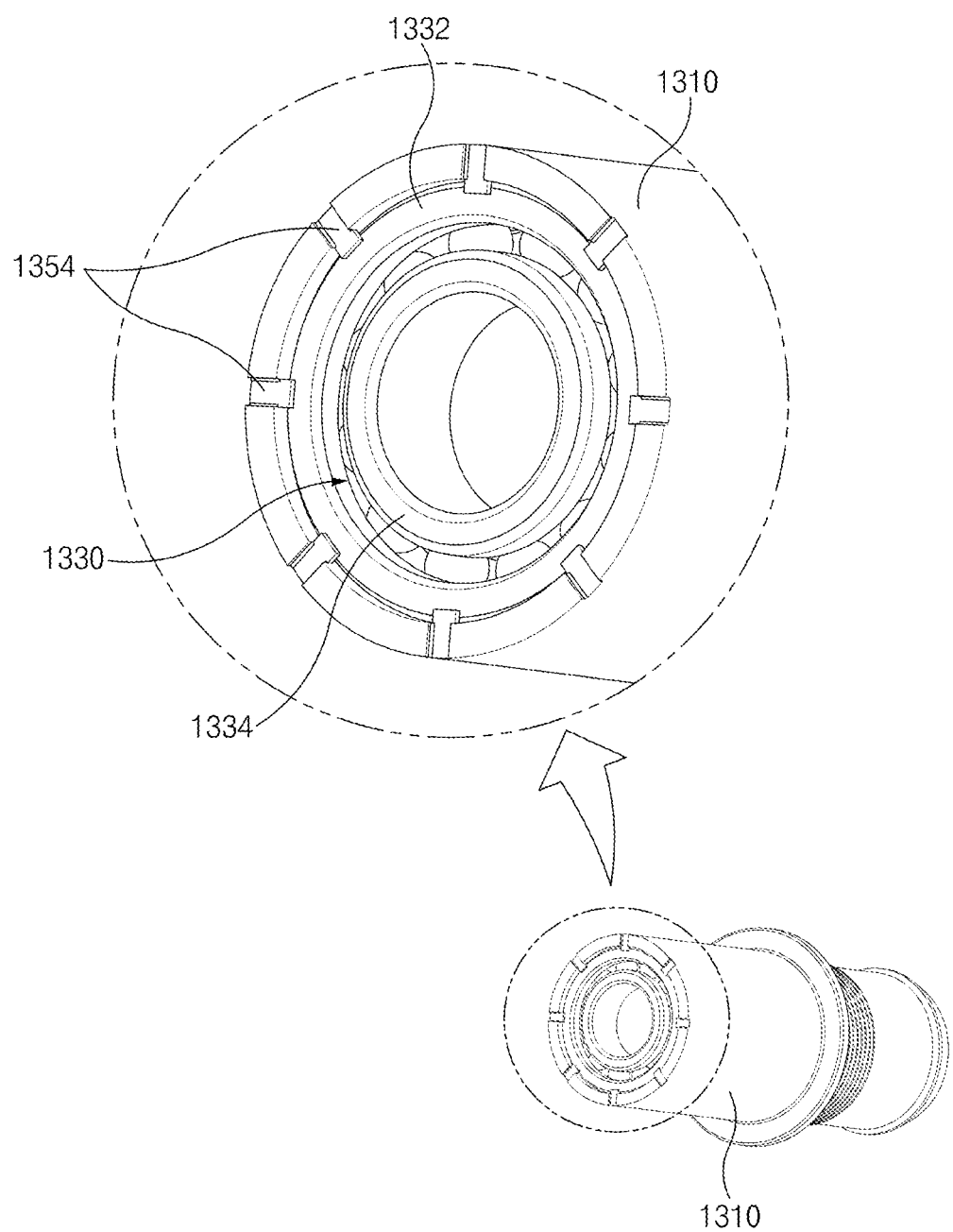

For example, referring to FIGS. 18 and 19, the bearing locking part 1350 may include: a stepped portion 1352 provided in the main spreader body 1310 and configured to support one end of the bearing member 1330; and caulking portions 1354 made by partially processing an end of the main spreader body 1310 and configured to support the other end of the bearing member 1330.

The stepped portion 1352 may be stepped on the inner surface of the main spreader body 1310 in a stepped manner. One end (a right end based on FIG. 17) of the bearing member 1330 may be seated on the stepped portion 1352.

The caulking portion 1354 may be made by partially processing the end of the main spreader body 1310. The caulking portion 1354 may have various structures capable of locking the other end (a left end based on FIG. 17) of the bearing member 1330.

For example, the caulking portion 1354 is integrated with the main spreader body 1310 by plastically deforming a part of the end of the main spreader body 1310 through caulking processing (press processing). The caulking portion 1354 may protrude from an inner peripheral surface of the main spreader body 1310 and be disposed to partially cover the other end of the bearing member 1330, thereby locking the other end of the bearing member 1330.

For example, when a caulking groove (not illustrated) recessed at the other end of the bearing member 1330 is pressed against a bottom portion with a predetermined pressure, a part of the bottom portion protrudes from the inner peripheral surface of the main spreader body 1310, such that the caulking portion 1354 may be provided.

The caulking portion 1354 may have various structures in accordance with required conditions and design specifications. The present disclosure is not restricted or limited by the structure and shape of the caulking portion 1354.

For example, the caulking portion 1354 may have an approximately quadrangular cross-sectional shape. According to another example of the second embodiment of the present disclosure, the caulking portion may have a semicircular cross-sectional shape or other shapes.

In particular, the caulking portion 1354 may be provided in plural, and the plurality of caulking portions 1354 may be spaced apart from one another in the circumferential direction of the main spreader body 1310. More particularly, the plurality of caulking portions 1354 may be spaced apart from one another at equal intervals in the circumferential direction of the main spreader body 1310.

Hereinafter, an example will be described in which a total of eight caulking portions 1354 are provided to be spaced apart from one another at equal intervals in the circumferential direction of the main spreader body 1310. According to another example of the second embodiment of the present disclosure, seven or less caulking portions may be provided, or nine or more caulking portions may be provided. The present disclosure is not restricted or limited by the number of caulking portions and the spacing intervals between the caulking portions.

As described above, the arrangement state of the bearing member 1330 is locked by means of the caulking portions 1354 made by partially processing the end (caulking groove) of the main spreader body 1310. Therefore, it is possible to obtain an advantageous effect of effectively inhibiting the separation of the bearing member 1330 without providing a separate bearing retainer.

According to the second exemplary embodiment of the present disclosure, the fuel cell system 10 may include a frame member 1400 configured to support the fuel cell stack 50. The air spreader 1300 may be supported on the frame member 1400.

For reference, the frame member 1400 serves to support the fuel cell stack 50 on an object (e.g., a construction machine).

The frame member 1400 may have various structures capable of supporting the fuel cell stack 50. The present disclosure is not restricted or limited by the type and structure of the frame member 1400.

For example, a cross member made of metal (e.g., an iron plate) and having an approximately quadrangular plate structure may be used as the frame member 1400. The fuel cell stack 50 may be seated on an upper portion (based on FIG. 21) of the frame member 1400.

The air spreader 1300 may be supported on the frame member 1400. The structure for supporting the air spreader 1300 on the frame member 1400 may be variously changed in accordance with required conditions and design specifications.

In particular, the air spreader 1300 may be supported on the frame member 1400 so that the air spreader 1300 is disposed at a point (target position) at which exhaust gas (hydrogen) may stagnate.

Figure 21:
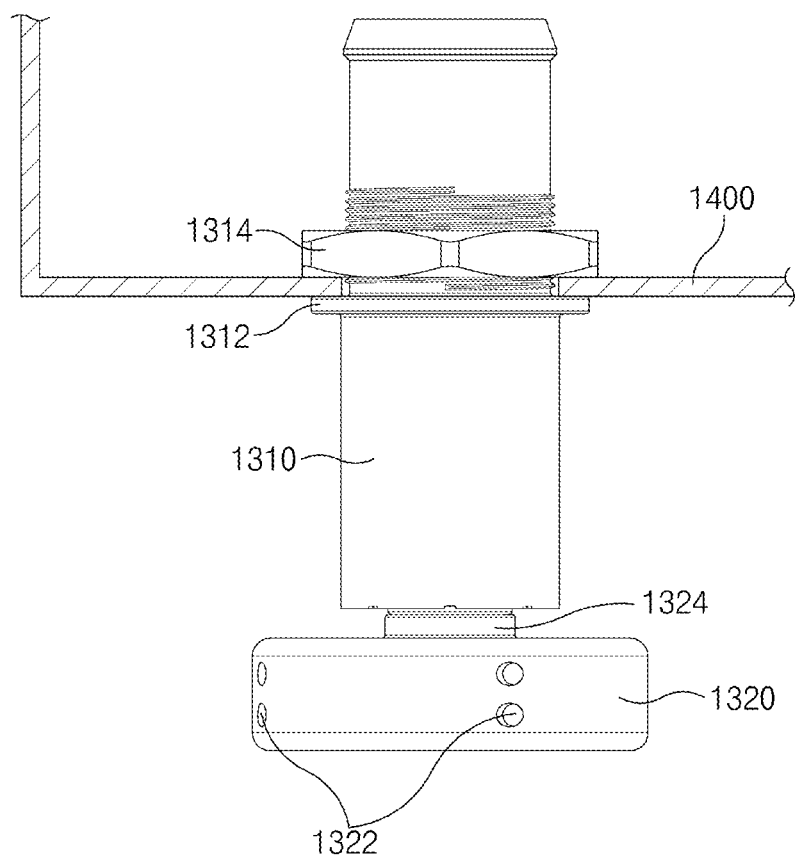
FIG. 21 is a view for explaining an example in which the air spreader according to the second embodiment of the present disclosure is mounted.

For example, referring to FIG. 21, the fuel cell system 10 may include: a flange portion 1312 provided on the outer peripheral surface of the main spreader body 1310 and supported on one surface of the frame member 1400; and a fastening member 1314 disposed on the other surface of the frame member 1400 and fastened to the main spreader body 1310.

The flange portion 1312 may be provided on the outer peripheral surface of the main spreader body 1310 and have a cross-sectional area (e.g., diameter) larger than that of a through-hole (not illustrated) provided in the frame member 1400 so that the main spreader body 1310 may pass through the through-hole.

The flange portion 1312 may be supported on one surface (a bottom surface based on FIG. 21) of the frame member 1400 in a state in which one end of the main spreader body 1310 passes through the through-hole (not illustrated) provided in the frame member 1400.

Various fastening means capable of being fastened to the main spreader body 1310 on the other surface (an upper surface based on FIG. 21) of the frame member 1400 may be used as the fastening member 1314.

For example, a screw thread portion (not illustrated) may be provided on the outer peripheral surface of the main spreader body 1310, and the fastening member 1314 may be screw-fastened to the screw thread portion of the main spreader body 1310.

Referring to FIGS. 22 to 30, an air injection device 2300 according to a third embodiment of the present disclosure includes: a main nozzle body 2310 having an air passageway 2310a through which air passes; a ball joint nozzle 2320 connected to the main nozzle body 2310, configured to be rotatable about one end of the main nozzle body 2310, and having an air injection hole 2321 configured to communicate with the air passageway 2310a; and a stopper member 2330 configured to selectively lock a posture of the ball joint nozzle 2320 with respect to the main nozzle body 2310.

For reference, the air injection device 2300 according to the third embodiment of the present disclosure may be used to inject air to various target positions. The present disclosure is not restricted or limited by the type and properties of the object to which the air injection device 2300 is applied.

Hereinafter, an example will be described in which the air injection device 2300 according to the present disclosure is used to reduce a hydrogen concentration in exhaust gas discharged from the fuel cell system 10 applied to mobility vehicles such as automobiles, ships, and airplanes.

For example, the fuel cell system 10 according to the third embodiment of the present disclosure may be applied to a construction machine (e.g., an excavator).

Figure 22:
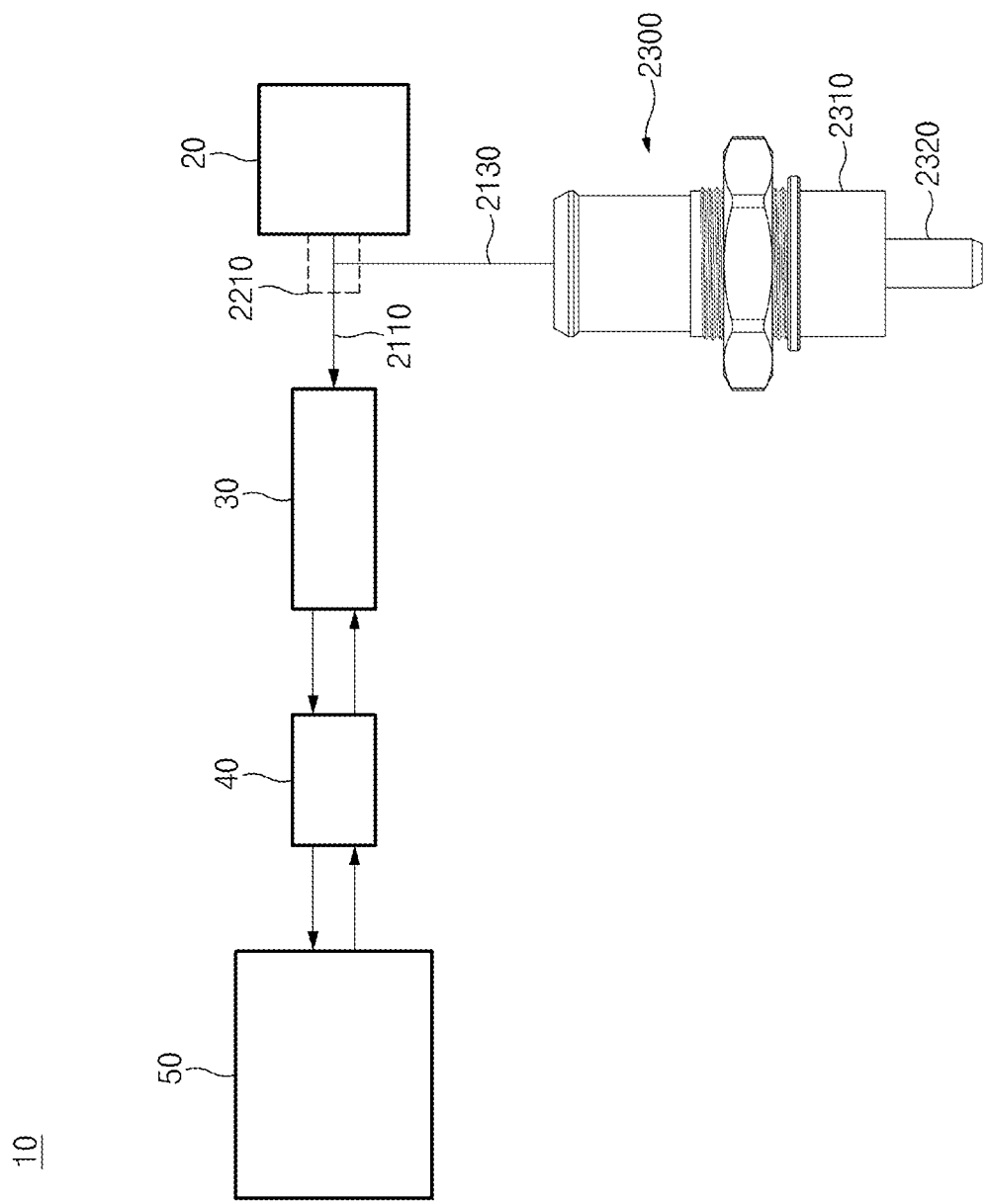
FIG. 22 is a view for explaining a fuel cell system according to a third embodiment of the present disclosure.
Figure 23:
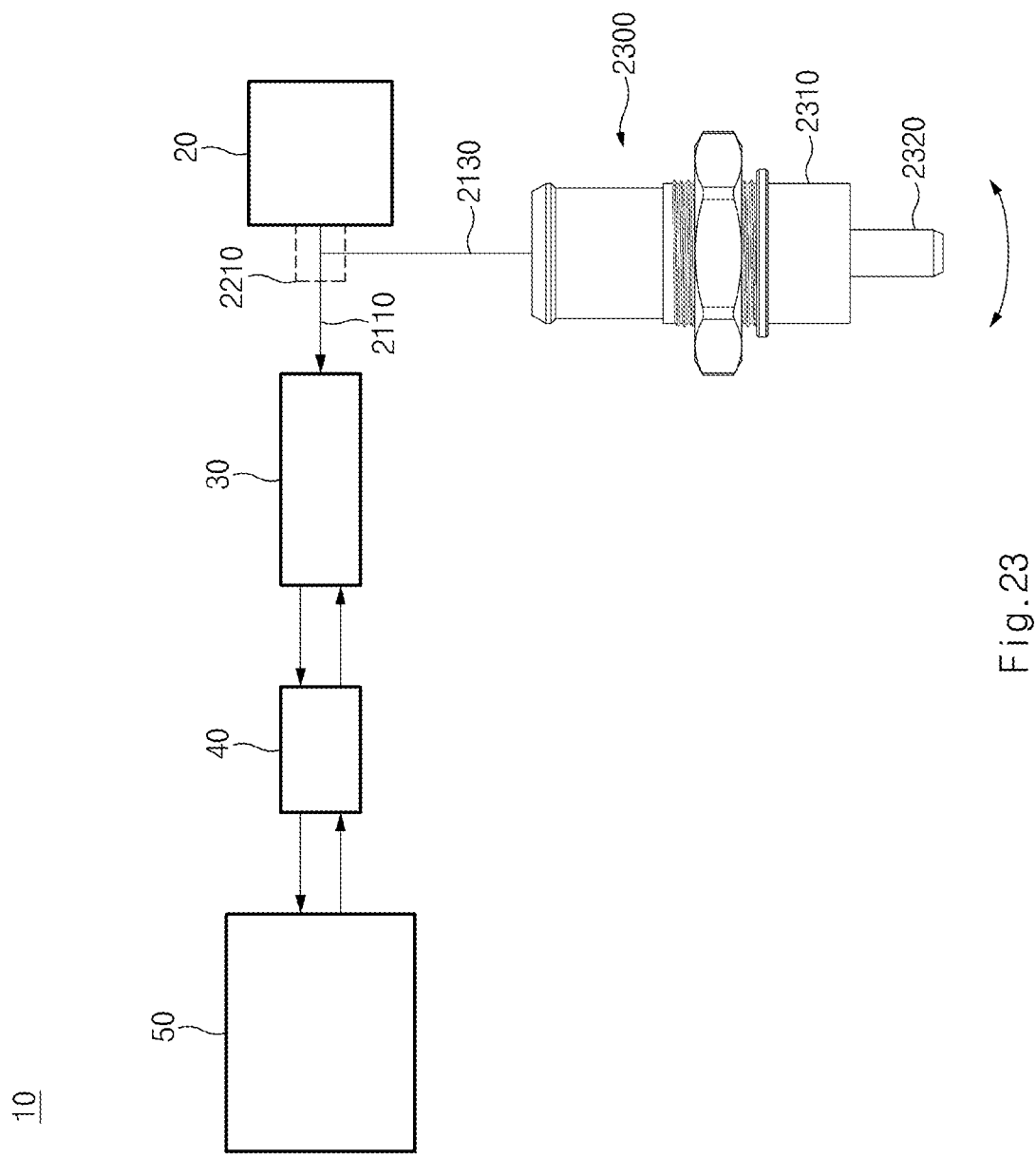
FIG. 23 is a view for explaining a flow path of air along a bypass line in the fuel cell system according to the third embodiment of the present disclosure.

Referring to FIGS. 22 and 23, according to the third exemplary embodiment of the present disclosure, the fuel cell system 10 includes: an air supply line 2110 configured to supply air to the fuel cell stack 50; a bypass line 2130 connected to the air supply line 2110 and configured to selectively allow the air to flow to the target position; the main nozzle body 2310 connected to the bypass line 2130 and having the air passageway 2310a through which the air passes; the ball joint nozzle 2320 connected to the main nozzle body 2310, configured to be rotatable about one end of the main nozzle body 2310, and having the air injection hole 2321 configured to communicate with the air passageway 2310a; and the stopper member 2330 configured to selectively lock a posture of the ball joint nozzle 2320 with respect to the main nozzle body 2310.

The air supply line 2110 is connected to a fuel cell stack 50 to supply the air to the fuel cell stack 50.

The air supply line 2110 may have various structures capable of supplying the air to the fuel cell stack 50. The present disclosure is not restricted or limited by the structure of the air supply line 2110.

According to the third exemplary embodiment of the present disclosure, the fuel cell system 10 may include an air compressor 20 connected to the air supply line 2110 and configured to compress the air to be supplied to the fuel cell stack 50.

The air compressor 20 compresses the air supplied through the air supply line 2110 and supplies the air to the fuel cell stack 50.

More specifically, the air compressor 20 may compress the air so that the air to be supplied to the fuel cell stack 50 may have a sufficient pressure that enables the air to pass through a flow path in the fuel cell stack 50.

Various air compressors 20 capable of compressing air may be used as the air compressor 20. The present disclosure is not restricted or limited by the type and structure of the air compressor 20. For example, the air compressor 20 may be configured to compress and supply the air using a centrifugal force generated by a rotation of a rotor (not illustrated).

For reference, the fuel cell stack 50 refers to a kind of power generation device that generates electrical energy through a chemical reaction of fuel (e.g., hydrogen), and the fuel cell stack may be configured by stacking several tens or hundreds of fuel cells (unit cells) in series.

The fuel cell may have various structures capable of producing electricity by means of an oxidation-reduction reaction between fuel (e.g., hydrogen) and an oxidant (e.g., air).

For example, the fuel cell may include: a membrane electrode assembly (MEA) (not illustrated) having catalyst electrode layers in which electrochemical reactions occur and which are attached to two opposite sides of an electrolyte membrane through which hydrogen ions move; a gas diffusion layer (GDL) (not illustrated) configured to uniformly distribute reactant gases and transfer generated electrical energy; a gasket (not illustrated) and a fastener (not illustrated) configured to maintain leakproof sealability for the reactant gases and a coolant and maintain an appropriate fastening pressure; and a separator (bipolar plate) (not illustrated) configured to move the reactant gases and the coolant.

More specifically, in the fuel cell, hydrogen, which is fuel, and air (oxygen), which is an oxidant, are supplied to an anode and a cathode of the membrane electrode assembly, respectively, through flow paths in the separator, such that the hydrogen is supplied to the anode, and the air is supplied to the cathode.

The hydrogen supplied to the anode is decomposed into hydrogen ions (protons) and electrons by catalysts in the electrode layers provided at two opposite sides of the electrolyte membrane. Only the hydrogen ions are selectively transmitted to the cathode through the electrolyte membrane, which is a cation exchange membrane, and at the same time, the electrons are transmitted to the cathode through the gas diffusion layer and the separator which are conductors.

At the cathode, the hydrogen ions supplied through the electrolyte membrane and the electrons transmitted through the separator meet oxygen in the air supplied to the cathode by an air supply device, thereby creating a reaction of producing water. As a result of the movement of the hydrogen ions, the electrons flow through external conductive wires, and the electric current is generated as a result of the flow of the electrons.

Meanwhile, the electrolyte membrane of the membrane electrode assembly needs to be maintained at a predetermined humidity or higher so that the fuel cell stack 50 normally operates.

To this end, the air supplied along the air supply line 2110 may pass through a humidifier 30, and the air to be supplied to the fuel cell stack 50 along the air supply line 2110 may be humidified while passing through the humidifier 30. In this case, the humidification of air is defined as a process of increasing the humidity of the air.

For example, the humidifier 30 may be configured to humidify air (dry air) to be supplied to the fuel cell stack 50 using air (moist air) discharged from the fuel cell stack 50.

The humidifier 30 may have various structures capable of humidifying the dry air using the air (moist air) discharged from the fuel cell stack 50. The present disclosure is not restricted or limited by the structure of the humidifier 30.

According to the third exemplary embodiment of the present disclosure, the humidifier 30 is disposed between an air compressor 20 and the fuel cell stack 50. The humidifier 30 may include an inflow gas supply port (not illustrated) through which inflow gas (dry air) is introduced (supplied), an inflow gas discharge port (not illustrated) through which the (humidified) inflow gas having passed through the interior of the humidifier 30 is discharged, a moist air supply port (not illustrated) through which moist air discharged from the fuel cell stack 50 is supplied, and a moist air discharge port (not illustrated) through which the moist air, which has humidified the inflow gas, is discharged to the outside.

The inflow gas supplied through the inflow gas supply port may be humidified by the moist air while passing through a humidification membrane (e.g., a hollow fiber membrane) (not illustrated) disposed in the humidifier 30.

Then, the inflow gas may be supplied to the fuel cell stack 50 through the inflow gas discharge port.

Further, the moist air (or the condensate water) discharged from the fuel cell stack 50 may be supplied to the moist air supply port, humidify the inflow gas in the humidifier 30, and then be discharged to the outside through the moist air discharge port.

According to the third exemplary embodiment of the present disclosure, the fuel cell system 10 may include an air control valve 40 configured to control the air entering and exiting the fuel cell stack 50 (the air to be introduced into the fuel cell stack and the air to be discharged from the fuel cell stack).

Various valves capable of selectively blocking the air entering and exiting the fuel cell stack 50 may be used as the air control valve 40. The present disclosure is not restricted or limited by the type and structure of the air control valve 40. For example, the air control valve 40 may include a first valve member (not illustrated) and a second valve member (not illustrated) that are configured to open or close a first port (not illustrated) through which the air is supplied to the fuel cell stack 50 and a second port (not illustrated) through which the air is discharged from the fuel cell stack 50.

In addition, a discharge line (not illustrated) may be connected to the fuel cell stack 50. The exhaust gas (e.g., air and hydrogen) discharged from the fuel cell stack 50 may be discharged to the outside through the discharge line.

For example, the exhaust gas discharged along the discharge line may pass through the humidifier 30. The air (dry air) introduced into the humidifier 30 may be humidified by the exhaust gas (moist air contained in the exhaust gas) passing through the humidifier 30.

The bypass line 2130 serves to selectively allow the air supplied through the air supply line 2110 to flow to the preset target position.

This is to reduce the hydrogen concentration in the exhaust gas that stagnates at the target position (e.g., in a power pack).

That is, hydrogen may be contained in the exhaust gas discharged from the fuel cell stack (e.g., the exhaust gas discharged during a purge process for adjusting a hydrogen concentration in the fuel cell stack). When a hydrogen concentration in the exhaust gas increases to a certain level or higher, the risk of explosion increases. Therefore, the hydrogen concentration in the exhaust gas discharged from the fuel cell needs to be maintained at a predetermined level or lower.

In the third embodiment of the present disclosure, a part of the air to be supplied to the fuel cell stack 50 through the air supply line 2110 is supplied to the target position through the bypass line 2130. Therefore, it is possible to obtain an advantageous effect of reducing the hydrogen concentration in the exhaust gas that stagnates at the target position.

Among other things, in the third embodiment of the present disclosure, the air (e.g., outside fresh air) supplied through the bypass line 2130 is supplied to the target position at which the exhaust gas stagnates. Therefore, it is possible to obtain an advantageous effect of reducing the risk of explosion by reducing the hydrogen concentration in the exhaust gas stagnating at the target position even under a condition in which vehicle-induced wind cannot be used (e.g., in a state in which a construction machine is stationary).

In addition, according to the third embodiment of the present disclosure, since the air having passed through the air compressor 20 is supplied through the bypass line 2130, it is not necessary to additionally provide a separate fan (an air supply fan) for forcibly supplying the air to reduce the hydrogen concentration at the target position. Therefore, it is possible to obtain an advantageous effect of simplifying the structure and improving the degree of design freedom and spatial utilization.

The bypass line 2130 may be connected in various manners in accordance with required conditions and design specifications. The present disclosure is not restricted or limited by the structure for connecting the bypass line 2130.

For example, according to the third exemplary embodiment of the present disclosure, the fuel cell system 10 may include a supply adapter 2210 provided on the air compressor 20. The bypass line 2130 may be connected to the air supply line 2110 through the supply adapter 2210.

A typical flexible tube may be used as the bypass line 2130. The present disclosure is not restricted or limited by the type and properties of the bypass line 2130. According to another example of the third embodiment of the present disclosure, a hard (rigid) tube may be used as the bypass line. Alternatively, the bypass line may be connected directly to the air supply line without separately providing the supply adapter.

The supply adapter 2210 may have various structures capable of being connected to the air compressor 20. The present disclosure is not restricted or limited by the structure and shape of the supply adapter 2210.

Figure 24:
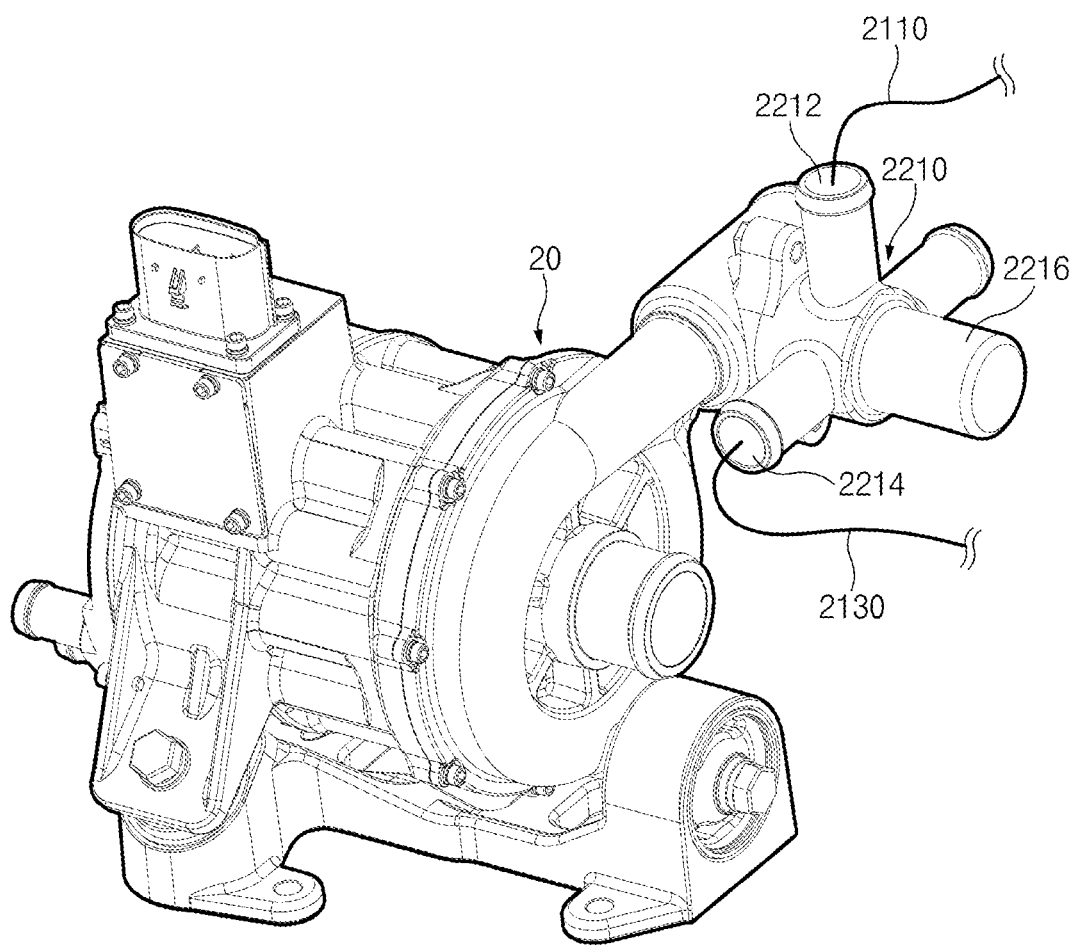
FIG. 24 is a view for explaining a supply adapter of the fuel cell system according to the third embodiment of the present disclosure.
Figure 25:
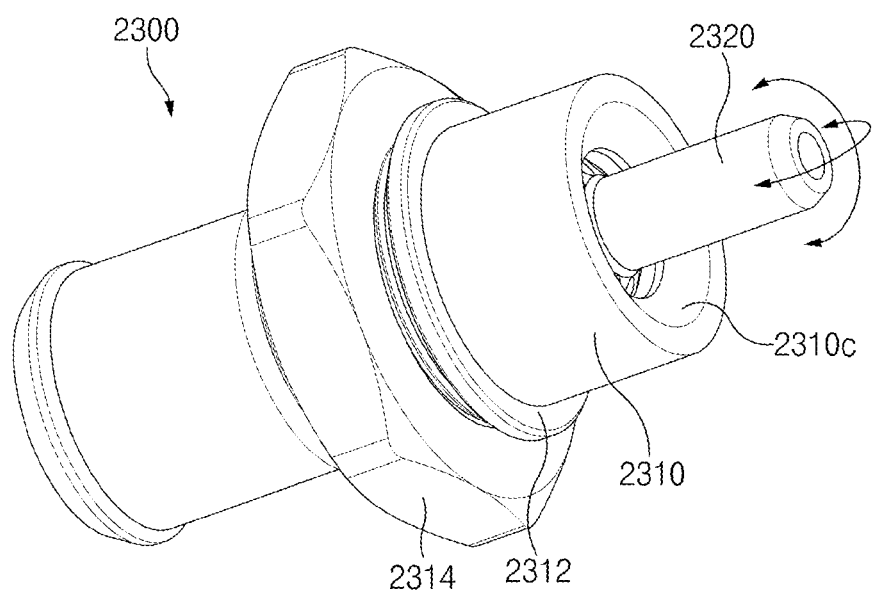
FIG. 25 is a perspective view for explaining an air injection device according to the third embodiment of the present disclosure.
Figure 26:
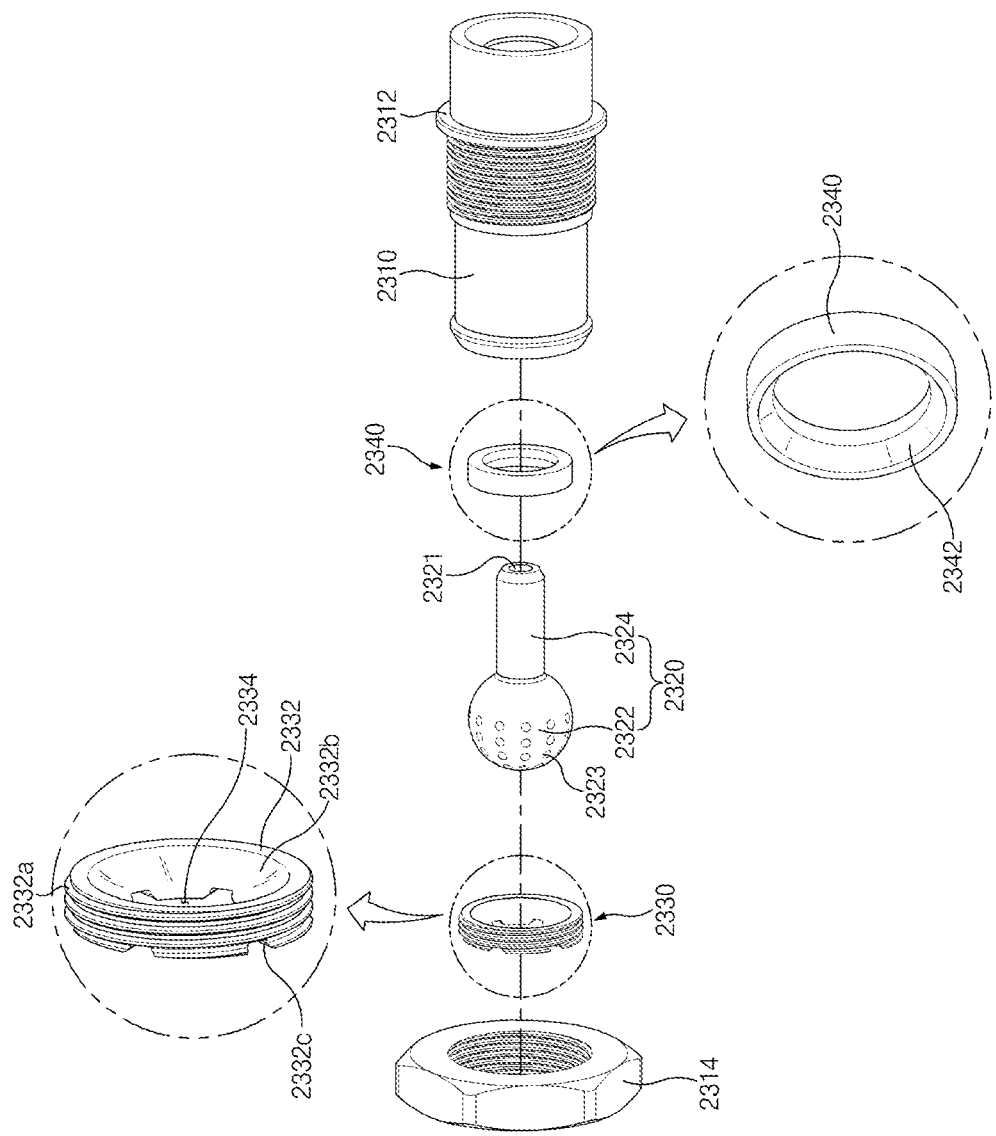
FIG. 26 is an exploded perspective view for explaining the air injection device according to the third embodiment of the present disclosure.

For example, referring to FIG. 24, the supply adapter 2210 may include a first supply port 2212 configured to communicate with the air supply line 2110, and a second supply port 2214 configured to communicate with the bypass line 2130.

Hereinafter, an example will be described in which a first valve 2216 configured to selectively open or close the second supply port 2214 is integrally provided on a lateral portion of the supply adapter 2210.

Various valve means capable of selectively opening or closing the second supply port 2214 may be used as the first valve 2216. The present disclosure is not restricted or limited by the type and structure of the first valve 2216. For example, a typical solenoid valve or a typical butterfly valve may be used as the first valve 2216.

With this configuration, in a state in which the first valve 2216 closes the second supply port 2214, the air compressed by the air compressor 20 may be supplied to the fuel cell stack 50 through the first supply port 2212. In contrast, in a state in which the first valve 2216 opens the second supply port 2214, a part of the air compressed by the air compressor 20 is supplied to the fuel cell stack 50 through the first supply port 2212, and another part of the air compressed by the air compressor 20 may be supplied to the bypass line 2130 through the second supply port 2214 (see FIG. 23).

Referring to FIGS. 25 to 30, the air injection device 2300 serves to inject air, which is supplied through the bypass line 2130, to the target position.

More specifically, the air injection device 2300 includes: the main nozzle body 2310 connected to the bypass line 2130 and having the air passageway 2310a through which the air passes; the ball joint nozzle 2320 connected to the main nozzle body 2310, configured to be rotatable about one end of the main nozzle body 2310, and having the air injection hole 2321 configured to communicate with the air passageway 2310a; and the stopper member 2330 configured to selectively lock the posture of the ball joint nozzle 2320 with respect to the main nozzle body 2310.

The main nozzle body 2310 may have various structures having the air passageway 2310a. The present disclosure is not restricted or limited by the structure and shape of the main nozzle body 2310.

For example, the main nozzle body 2310 may have a hollow cylindrical shape having the air passageway 2310a therein. The bypass line 2130 may be connected to one end of the main nozzle body 2310, and the ball joint nozzle 2320 may be rotatably connected to the other end of the main nozzle body 2310.

The ball joint nozzle 2320 is configured to rotate about one end (ball joint part) thereof relative to the main nozzle body 2310. The air injection hole 2321, which communicates with the air passageway 2310a, is provided in the ball joint nozzle 2320.

The ball joint nozzle 2320 may have various structures capable of freely rotating about one end thereof relative to the main nozzle body 2310. The present disclosure is not restricted or limited by the structure of the ball joint nozzle 2320.

For example, the ball joint nozzle 2320 includes: a ball joint part 2322 rotatably accommodated in the main nozzle body 2310; and a nozzle part 2324 extending from the ball joint part 2322 and exposed to the outside of an outlet end of the main nozzle body 2310. The air injection hole 2321 may be provided to continuously penetrate the ball joint part 2322 and the nozzle part 2324.

In this case, the configuration in which the air injection hole 2321 continuously penetrates the ball joint part 2322 and the nozzle part 2324 may mean that one end of the air injection hole 2321 is exposed to the ball joint part 2322 and the other end of the air injection hole 2321 is exposed to the end (outlet) of the nozzle part 2324.

More specifically, the ball joint part 2322 has a spherical shape and is rotatably accommodated in the main nozzle body 2310.

An inlet end of the main nozzle body 2310 has a diameter larger than a diameter of the ball joint part 2322, and an outlet end of the main nozzle body 2310 has a diameter smaller than a diameter of the ball joint part 2322. Therefore, the ball joint part 2322 may be inserted into the main nozzle body 2310 through the inlet end of the main nozzle body 2310 but cannot be withdrawn through the outlet end of the main nozzle body 2310.

The nozzle part 2324 is integrally connected to the ball joint part 2322 and protrudes (exposed) to the outside of the outlet end of the main nozzle body 2310, such that the nozzle part 2324 and the ball joint part 2322 collectively define the air injection hole 2321.

For example, the nozzle part 2324 may have an approximately straight shape. The air injection hole 2321 may have an approximately straight shape that continuously penetrates the ball joint part 2322 and the nozzle part 2324.

According to another example of the third embodiment of the present disclosure, the nozzle part may have a curved shape or other shapes. Alternatively, the air injection hole may have a curved shape (or bent shape).

The stopper member 2330 serves to selectively lock the posture of the ball joint nozzle 2320 with respect to the main nozzle body 2310.

In this case, the configuration in which the posture of the ball joint nozzle 2320 with respect to the main nozzle body 2310 is locked means that a rotation position and a rotation angle of the ball joint part 2322 with respect to the main nozzle body 2310 are locked.

The stopper member 2330 may have various structures capable of locking the ball joint part 2322. The present disclosure is not restricted or limited by the structure of the stopper member 2330.

For example, the stopper member 2330 may include: a stopper ring 2332 locked to an inner peripheral surface of the main nozzle body 2310 and configured to support the ball joint part 2322 on the main nozzle body 2310; and a through-hole 2334 provided in the stopper ring 2332 so that the air injection hole 2321 is exposed to the air passageway 2310a.

The stopper ring 2332 may have a ring shape having an outer diameter corresponding to an inner diameter of the main nozzle body 2310. The through-hole 2334 may be provided in an approximately central portion of the stopper ring 2332 so that the air injection hole 2321 and the air passageway 2310a communicate with each other.

The stopper ring 2332 may be locked to the inner peripheral surface of the main nozzle body 2310 in various ways in accordance with required conditions and design specifications. The present disclosure is not restricted or limited by the method of locking the stopper ring 2332 and the main nozzle body 2310.

For example, the air injection device 2300 may include: a first screw thread portion 2310b provided on an outer peripheral surface of the stopper ring 2332; and a second screw thread portion 2332a provided on the inner peripheral surface of the main nozzle body 2310 so as to be screw-fastened to the first screw thread portion 2310b. The stopper ring 2332 may be locked to the main nozzle body 2310 as the first screw thread portion 2310b is screw-fastened to the second screw thread portion 2332a.

For reference, the position of the stopper ring 2332 with respect to the main nozzle body 2310 (the position in the leftward/rightward direction based on FIG. 27) may be adjusted by rotating the stopper ring 2332 clockwise or counterclockwise relative to the main nozzle body 2310.

Figure 27:
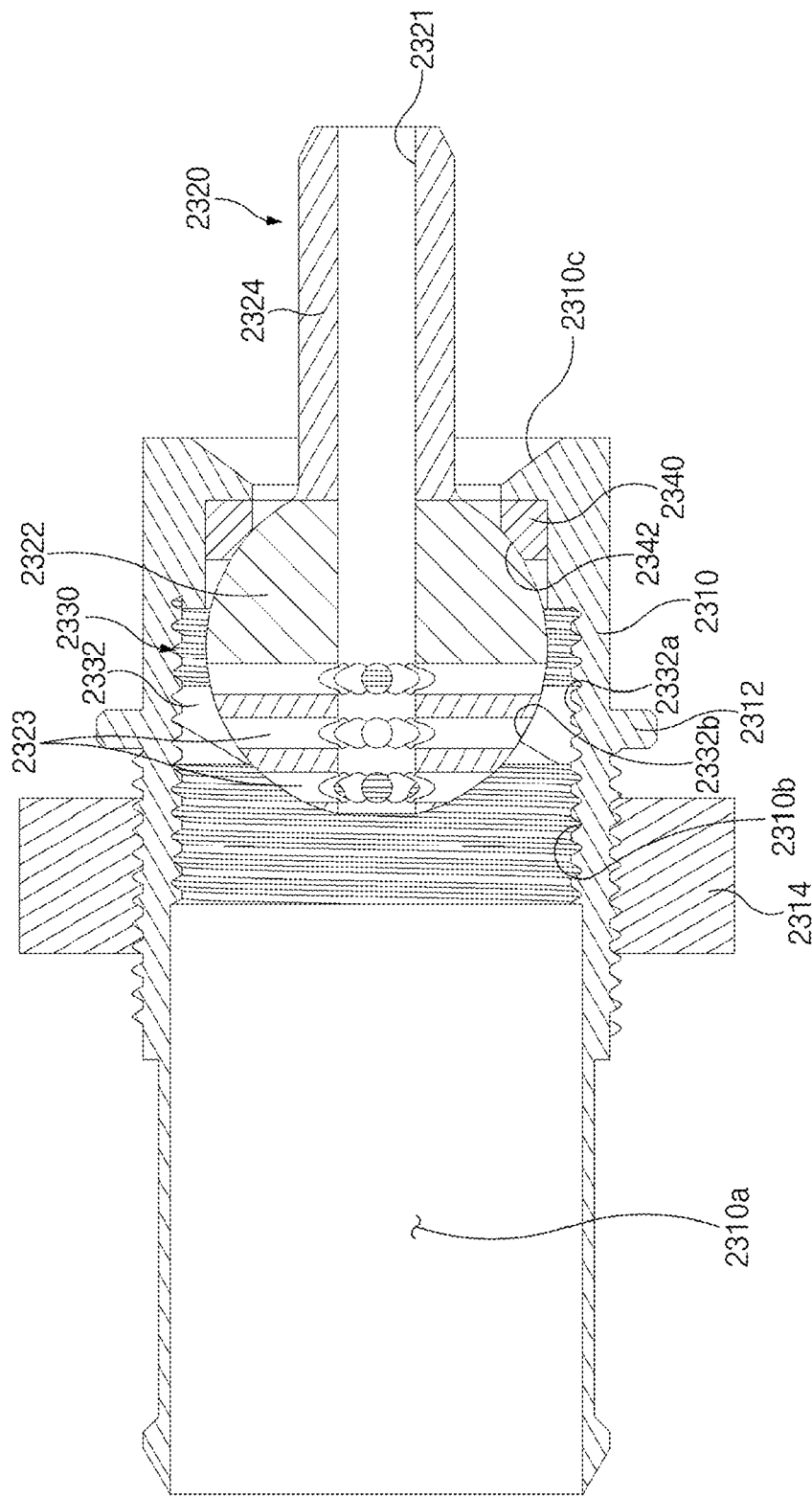
FIG. 27 is a cross-sectional view for explaining the air injection device according to the third embodiment of the present disclosure.
Figure 28:
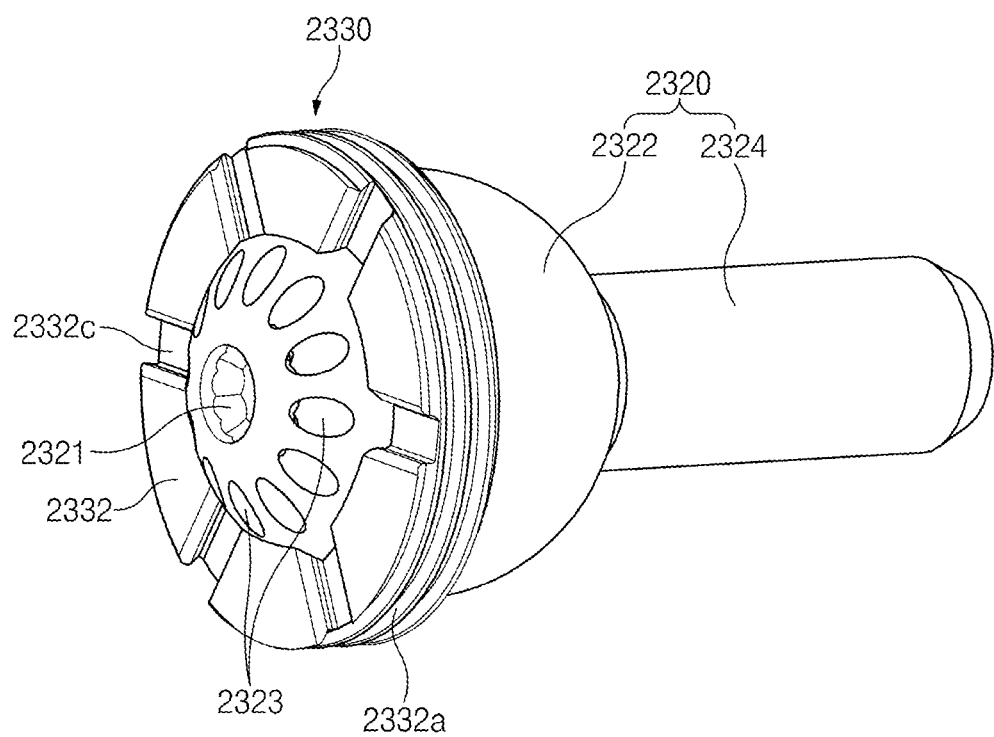
FIG. 28 is a view for explaining a stopper member of the air injection device according to the third embodiment of the present disclosure.
Figure 29:
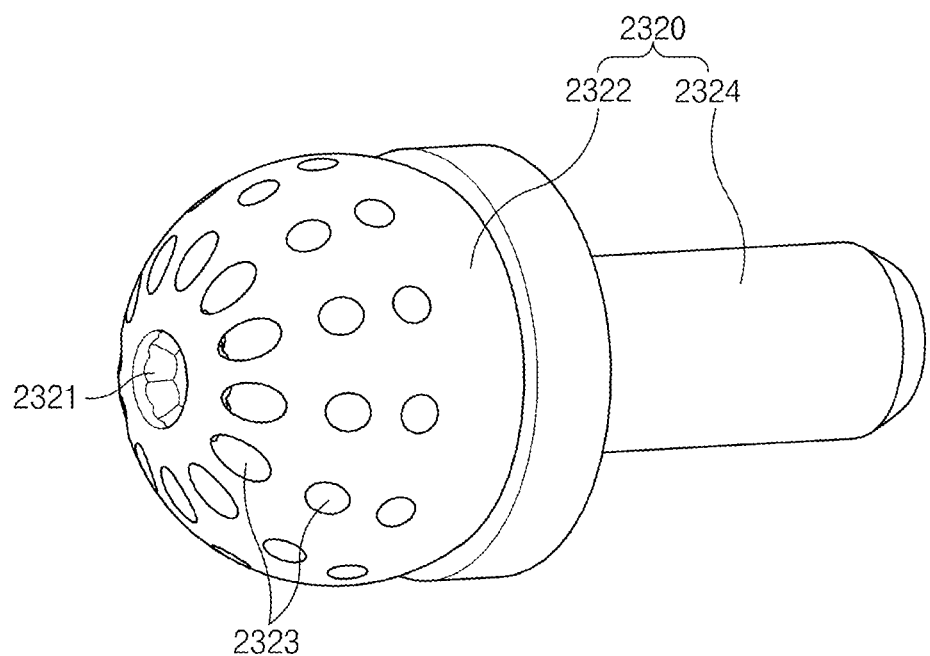
FIG. 29 is a view for explaining a sealing member of the air injection device according to the third embodiment of the present disclosure.

For example, when the stopper ring 2332 is rotated clockwise relative to the main nozzle body 2310, the stopper ring 2332 may move toward the ball joint part 2322 (in the right direction based on FIG. 27). When the stopper ring 2332 is rotated counterclockwise relative to the main nozzle body 2310, the stopper ring 2332 may move away from the ball joint part 2322 (in the left direction based on FIG. 27).

In particular, tool seating grooves 2332c may be provided in the stopper ring 2332, and a tool for rotating the stopper ring 2332 may be fastened to the tool seating grooves 2332c.

The tool seating groove 2332c may have various structures capable of being fastened to the tool. The present disclosure is not restricted or limited by the structure of the tool seating groove 2332c and the number of tool seating grooves 2332c.

For example, the tool seating groove 2332c may have an approximately quadrangular groove and be provided on one surface of the stopper ring 2332 (the surface facing the inlet of the main nozzle body). The tool seating groove 2332c may be provided in plural, and the plurality of tool seating grooves 2332c is spaced apart from one another in a circumferential direction of the stopper ring 2332.

In particular, the air injection device 2300 may include a curved seating portion 2332b provided on the other surface of the stopper ring 2332 (the surface facing the ball joint part). The ball joint part 2322 may be seated on the curved seating portion 2332b.

The curved seating portion 2332b may be provided in the form of a curved surface corresponding to an outer surface (curved surface) of the ball joint part 2322. When the stopper ring 2332 comes into contact with the ball joint part 2322, the outer surface of the ball joint part 2322 may come into close contact with the curved seating portion 2332b.

As described above, the ball joint part 2322 is seated in the state in which the outer surface of the ball joint part 2322 is in close contact with the curved seating portion 2332b, such that a contact area between the ball joint part 2322 and the stopper ring 2332 may increase. Therefore, it is possible to obtain an advantageous effect of more stably maintaining the locked state of the ball joint part 2322 and minimizing the inadvertent movement and rotation of the ball joint part 2322.

According to the third exemplary embodiment of the present disclosure, the air injection device 2300 may include communication holes 2323 provided in the ball joint part 2322 so as to communicate with the air injection hole 2321. The communication holes 2323 are exposed to the air passageway 2310a.

The communication holes 2323 serve to supply air in the air passageway 2310a to the air injection hole 2321 when an inlet (left end based on FIG. 27) of the air injection hole 2321 is blocked by the stopper ring 2332 or the like.

That is, when the ball joint part 2322 rotates at a predetermined angle, the inlet (left end based on FIG. 27) of the air injection hole 2321 may be blocked and closed by the stopper ring 2332 or the like. According to the third embodiment of the present disclosure, the communication holes 2323 are provided in the ball joint part 2322. Therefore, the air may be stably supplied to the air injection hole 2321 through the communication holes 2323 even though the inlet of the air injection hole 2321 is blocked. Therefore, a rotation angle of the ball joint part 2322 may be freely changed without a limitation caused by the blocked air injection hole 2321 (a constraint on the rotation angle of the ball joint part).

The communication hole 2323 may be variously changed in number and arrangement interval in accordance with required conditions and design specifications. The present disclosure is not restricted or limited by the number of communication holes 2323 and the arrangement intervals between the communication holes 2323.

In particular, the communication hole 2323 may be provided in plural, and the plurality of communication holes 2323 may be radially disposed around the air injection hole 2321 based on the air injection hole 2321 (the inlet of the air injection hole). Since the plurality of communication holes 2323 is provided in the ball joint part 2322 like the arrangement of dimples of a golf ball as described above, it is possible to obtain an advantageous effect of minimizing the constraint on the rotation angle of the ball joint part 2322.

According to the third exemplary embodiment of the present disclosure, the air injection device 2300 may include a sealing member 2340 interposed between the ball joint part 2322 and the outlet end of the main nozzle body 2310.

The sealing member 2340 may have various structures capable of sealing a gap between the ball joint part 2322 and the outlet end of the main nozzle body 2310. The present disclosure is not restricted or limited by the structure of the sealing member 2340.

For example, the sealing member 2340 may have an approximately ring shape and be interposed between the ball joint part 2322 and the outlet end of the main nozzle body 2310.

The sealing member 2340 may be made of an elastic material such as silicone or urethane. The present disclosure is not restricted or limited by the material and properties of the sealing member 2340.

As described above, according to the third embodiment of the present disclosure, the sealing member 2340 is disposed between the ball joint part 2322 and the outlet end of the main nozzle body 2310. Therefore, it is possible to obtain an advantageous effect of minimizing a leak of air through the gap between the ball joint part 2322 and the outlet end of the main nozzle body 2310 and stably maintaining air injection performance implemented by the nozzle part 2324.

In particular, the sealing member 2340 may have a curved close-contact portion 2342 being in close contact with the ball joint part 2322.

The curved close-contact portion 2342 may be provided in the form of a curved surface corresponding to the outer surface (curved surface) of the ball joint part 2322. When the sealing member 2340 comes into contact with the ball joint part 2322, the outer surface of the ball joint part 2322 may come into close contact with the curved close-contact portion.

As described above, the outer surface of the ball joint part 2322 is in close contact with the curved close-contact portion 2342, such that a contact area between the ball joint part 2322 and the sealing member 2340 may increase. Therefore, it is possible to obtain an advantageous effect of more stably maintaining the arrangement state of the ball joint part 2322 and further improving the sealing performance implemented by the sealing member 2340.

According to the third exemplary embodiment of the present disclosure, the air injection device 2300 may include a tapered portion 2310c provided on the outlet end of the main nozzle body so that a cross-sectional area of the main nozzle body increases from a proximal end adjacent to the ball joint part 2322 to a distal end.

That is, referring to FIG. 27, the tapered portion 2310c may be provided on an inner surface of the outlet end (right end based on FIG. 27) of the main nozzle body and have a cross-sectional area that increases from the left side to the right side.

Since the tapered portion 2310c is provided on the inner surface of the outlet end of the main nozzle body as described above, the interference between the main nozzle body and the nozzle part 2324 may be reduced when the ball joint nozzle 2320 rotates. Therefore, it is possible to implement a further increased rotation angle (rotation angle of the nozzle part) of the ball joint part 2322 with respect to the main nozzle body.

According to the third exemplary embodiment of the present disclosure, the fuel cell system 10 may include a frame member 2400 configured to support the fuel cell stack 50. The air injection device 2300 may be supported on the frame member 2400.

For reference, the frame member 2400 serves to support the fuel cell stack 50 on an object (e.g., a construction machine).

The frame member 2400 may have various structures capable of supporting the fuel cell stack 50. The present disclosure is not restricted or limited by the type and structure of the frame member 2400.

For example, a cross member made of metal (e.g., an iron plate) and having an approximately quadrangular plate structure may be used as the frame member 2400. The fuel cell stack 50 may be seated on an upper portion (based on FIG. 30) of the frame member 2400.

The air injection device 2300 may be supported on the frame member 2400. The structure for supporting the air injection device 2300 on the frame member 2400 may be variously changed in accordance with required conditions and design specifications.

In particular, the air injection device 2300 may be supported on the frame member 2400 so that the air injection device 2300 is disposed at a point (target position) at which exhaust gas (hydrogen) may stagnate.

Figure 30:
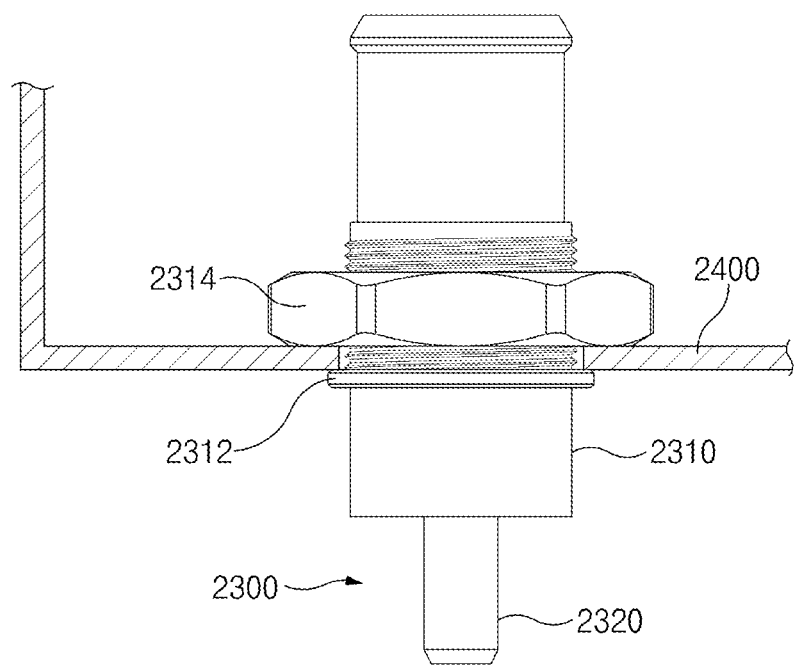
FIG. 30 is a view for explaining an example in which the air injection device according to the third embodiment of the present disclosure is mounted.

For example, referring to FIG. 30, the fuel cell system 10 may include: a flange portion 2312 provided on the outer peripheral surface of the main nozzle body 2310 and supported on one surface of the frame member 2400; and a fastening member 2314 disposed on the other surface of the frame member 2400 and fastened to the main nozzle body 2310.

The flange portion 2312 may be provided on the outer peripheral surface of the main nozzle body 2310 and having a cross-sectional area (e.g., diameter) larger than that of a passing hole (not illustrated) provided in the frame member 2400 so that the main nozzle body 2310 may pass through the passing hole.

The flange portion 2312 may be supported on one surface (a bottom surface based on FIG. 30) of the frame member 2400 in a state in which one end of the main nozzle body 2310 passes through the passing hole (not illustrated) provided in the frame member 2400.

Various fastening means capable of being fastened to the main nozzle body 2310 on the other surface (an upper surface based on FIG. 30) of the frame member 2400 may be used as the fastening member 2314.

For example, a screw thread portion (not illustrated) may be provided on the outer peripheral surface of the main nozzle body 2310, and the fastening member 2314 may be screw-fastened to the screw thread portion of the main nozzle body 2310.

According to the embodiment of the present disclosure described above, it is possible to obtain an advantageous effect of reducing a hydrogen concentration at the target position.

In particular, according to the embodiment of the present disclosure, it is possible to obtain an advantageous effect of reducing a hydrogen concentration in the exhaust gas, which is discharged from the fuel cell stack and then stagnates at the target position, even under the condition in which the vehicle-induced wind cannot be used.

In addition, according to the embodiment of the present disclosure, it is possible to obtain an advantageous effect of simplifying the structure and improving the spatial utilization and the degree of design freedom.

In addition, according to the embodiment of the present disclosure, it is possible to obtain an advantageous effect of improving the safety and reliability.

In addition, according to the embodiment of the present disclosure, it is possible to obtain an advantageous effect of simplifying the manufacturing process and reducing the costs.

While the embodiments have been described above, the embodiments are just illustrative and not intended to limit the present disclosure. It can be appreciated by those skilled in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

What is claimed is:

1. A fuel cell system comprising:
an air supply line to supply air to a fuel cell stack;
a bypass line connected to the air supply line, wherein the bypass line allows the air to flow to a target position;
a bypass valve to selectively open or close the bypass line, the bypass valve comprising:
 a valve housing including a first supply port connected to the air supply line, and a second supply port to communicate with the bypass line;
 a valve member to be movable from a first position at which the valve member closes the second supply port to a second position at which the valve member opens the second supply port, wherein the valve member rectilinearly moves from the first position to the second position;
 a solenoid to provide driving power to move the valve member from the second position to the first position; and
 an elastic member to provide an elastic force to move the valve member to the second position;
a guide protrusion disposed on the valve member;
a guide hole disposed in the valve housing, wherein the guide hole accommodates the guide protrusion so that the guide protrusion is rectilinearly moveable;
a connection adapter including a first connection port to communicate with the second supply port, and a second connection port connected to the bypass line;
an air compressor connected to the air supply line and compresses the air to be supplied to the fuel cell stack; and
an air spreader disposed at an end of the bypass line and injects the air to the target position,
wherein the rectilinear movement of the valve member is perpendicular to a wall of the valve housing;
wherein the rectilinear movement of the valve member corresponds to a linear path formed between the first connection port and the second supply port;
wherein the rectilinear movement of the valve member is perpendicular to a direction facing into the second connection port; and
wherein the air spreader includes a main spreader body connected to the bypass line and having an air passageway through which air passes, and a rotary nozzle rotatably provided on the main spreader body and having air injection holes configured to communicate with the air passageway.

2. The fuel cell system of claim 1, further comprising: a support protrusion disposed on the valve member, wherein the elastic member is interposed between the valve housing and the support protrusion.

3. The fuel cell system of claim 1, further comprising: a valve sealing member to seal a gap between the second supply port and the valve member.

4. The fuel cell system of claim 1, further comprising: an adapter sealing member interposed between the valve housing and the connection adapter.

5. The fuel cell system of claim 1, wherein the connection adapter accommodates the solenoid.

6. The fuel cell system of claim 1, further comprising: a buffer member interposed between the solenoid and the valve member.

* * * * *